United States Patent
Brochu et al.

(10) Patent No.: US 10,877,970 B1
(45) Date of Patent: Dec. 29, 2020

(54) IDENTIFYING RELEVANT DATA SOURCES FOR A DATA VISUALIZATION APPLICATION

(71) Applicant: Tableau Software, Inc., Seattle, WA (US)

(72) Inventors: Eric Brochu, Vancouver (CA); Mark Siegel, Vancouver (CA)

(73) Assignee: Tableau Software, Inc., Seattle, WA (US)

(*) Notice: Subject to any disclaimer, the term of this patent is extended or adjusted under 35 U.S.C. 154(b) by 267 days.

(21) Appl. No.: 16/151,157

(22) Filed: Oct. 3, 2018

Related U.S. Application Data

(60) Provisional application No. 62/569,424, filed on Oct. 6, 2017.

(51) Int. Cl.
G06F 16/00 (2019.01)
G06F 16/2455 (2019.01)
G06F 16/26 (2019.01)
G06F 16/2457 (2019.01)

(52) U.S. Cl.
CPC ...... *G06F 16/2455* (2019.01); *G06F 16/2457* (2019.01); *G06F 16/26* (2019.01)

(58) Field of Classification Search
CPC .............................. G06F 16/2457; G06F 16/26
See application file for complete search history.

(56) References Cited

U.S. PATENT DOCUMENTS

2009/0083126 A1* 3/2009 Koren ................ G06Q 30/0631
705/7.29
2019/0095502 A1* 3/2019 Beringer ............. G06F 16/2457

* cited by examiner

*Primary Examiner* — Grace Park
(74) *Attorney, Agent, or Firm* — Morgan, Lewis & Bockius LLP

(57) ABSTRACT

A method identifies relevant data sources in a data visualization user interface. The process constructs an interaction matrix X whose rows correspond to users and whose columns correspond to data sources. Each entry measures the extent to which a user interacts with a data source according to user interactions with data visualizations generated from the data source. The method factors X into a product of a user matrix U times a source matrix $S^T$ using iterative refinement to minimize the least squares difference between X and $U \cdot S^T$. A user connects to a data server. The method computes affinity scores between the user and data sources. Each affinity score is a dot product of a row of U (a user) and a row of S (a data source). The method selects some data sources corresponding to high computed affinity scores and returns the selected data sources to the user.

20 Claims, 19 Drawing Sheets

400 ↙

| workbook (402) | datasource (404) |
|---|---|
| wb1 | ds1 |
| wb2 | ds1 |
| wb3 | ds2 |

| workbook (412) | User ID (414) | # of views (416) | |
|---|---|---|---|
| wb1 | user 1 | 17 | ← 422 |
| wb1 | user 2 | 4 | ← 424 |
| wb2 | user 1 | 1 | |
| wb3 | user 1 | 10 | ← 426 |
| wb3 | user 3 | 100 | |

| | # of views associated with ds1 (432) | # of views associated with ds2 (434) |
|---|---|---|
| 440 User 1 → | 18 (442) | 10 (444) |
| User 2 → | 4 | 0 |
| User 3 → | 0 | 100 |

Figure 4C

| | user_id integer | system_users_name character varying(255) | us sy viz_id tir d integer | s\ vi vie\ workbook_id m dk text integer | w w wk viz_title bi m isi text | w dk view_count bi te integer | last_view_time timestamp without time zone | site_sid integer |
|---|---|---|---|---|---|---|---|---|
| 1 | 3 | builder | 20 bi 16 | 3 Re Ill 3 | Regressions | 1 | 2018-09-19 16:39:31.075 | 1 |
| 2 | 7 | builder | 20 bi 299 | 3 Mo Mon 42 | Monthly Server Stats | 1 | | 2 |
| 3 | 7 | builder | 20 bi 357 | 3 Da Wor 49 | Daily Resource | 6 | | 2 |
| 4 | 7 | builder | 20 bi 365 | 3 To Pub 43 | Top Individual Subscribers | 2 | | 2 |
| 5 | 7 | builder | 20 bi 334 | 3 Se Sta 46 | Server Usage | 3 | | 2 |
| 6 | 7 | builder | 20 bi 346 | 3 Wo Wor 49 | Workbook Info | 4 | | 2 |

| | $ds_1$ | $ds_2$ | $ds_3$ | ... | $ds_n$ |
|---|---|---|---|---|---|
| 472-1 User 1 | 1.0 | 0 | 5.0 | 0 0 0 0 | 0 |
| 472-2 User 2 | 0 | 3.0 | 0 | 0 0 0 11.0 | 0 |
| User 3 | 0 | 0 | 6.0 | 0 0 0 0 | 0 |
| | 0 | 0 | 0 | 9.0 0 0 0 | 0 |
| | 2.0 | 0 | 0 | 0 0 10.0 0 | 0 |
| | 0 | 0 | 7.0 | 0 0 0 0 | 0 |
| | 0 | 0 | 0 | 8.0 0 0 0 | 0 |
| 472-m User m | 0 | 4.0 | 0 | 0 0 0 0 | 12.0 |

474-1 → $ds_1$   474-2 → $ds_2$   474-n → $ds_n$

476 → (3.0 circled)

Figure 4E

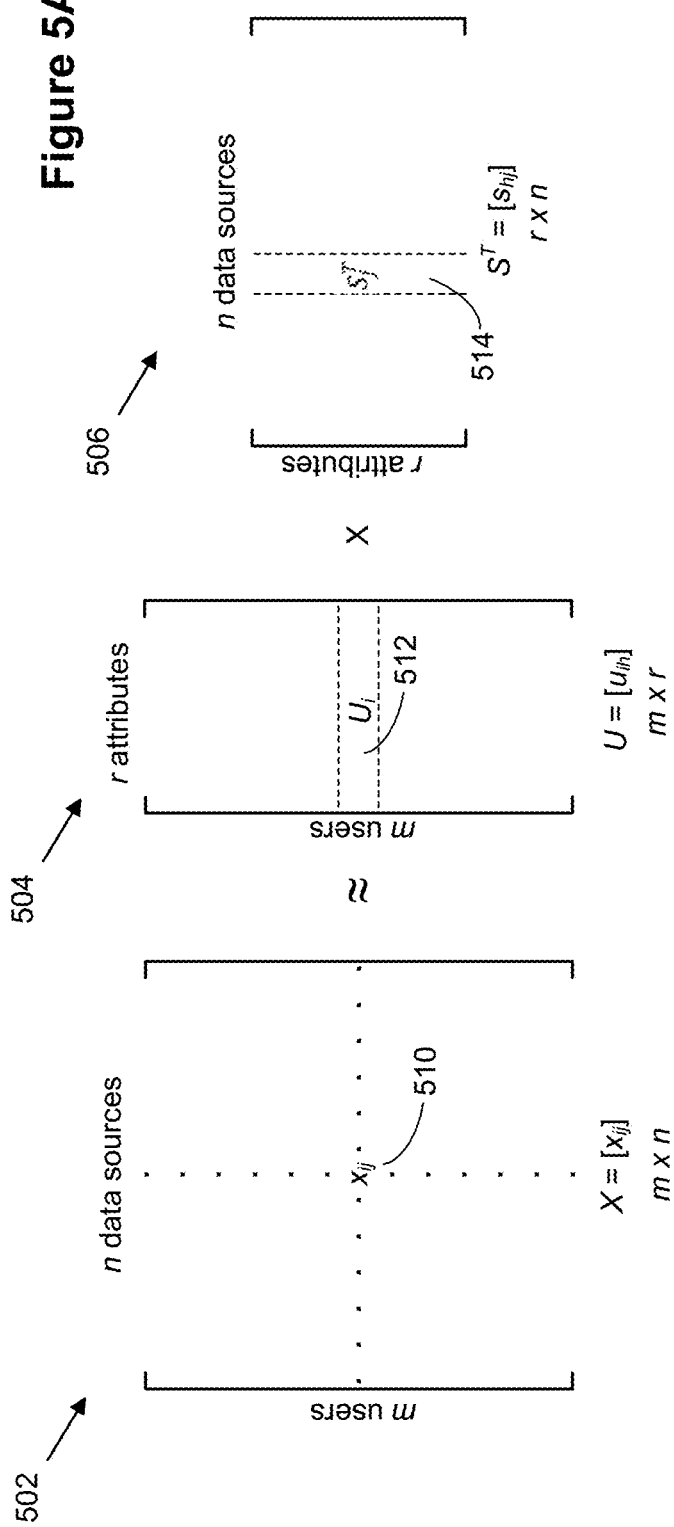

```
def alternating_least_squares(Cui, factors, regularization, iterations=20):
    users, items = Cui.shape X = np.random.rand(users, factors) * 0.01
    Y = np.random.rand(items, factors) * 0.01

Ciu = Cui.T.tocsr()
    for iteration in range(iterations):
        least_squares(Cui, X, Y, regularization)
        least_squares(Ciu, Y, X, regularization)

return X, Y def least_squares(Cui, X, Y, regularization):
    users, factors = X.shape
    YtY = Y.T.dot(Y)

for u in range(users):
        # accumulate YtCuY + regularization * I in A
        A = YtY + regularization * np.eye(factors)

# accumulate YtCuPu in b
        b = np.zeros(factors)

for i, confidence in nonzeros(Cui, u):
            factor = Y[i]
            A += (confidence - 1) * np.outer(factor, factor)
            b += confidence * factor

# Xu = (YtCuY + regularization * I)^-1 (YtCuPu)
        X[u] = np.linalg.solve(A, b)
```

Figure 5D

IDENTIFYING RELEVANT DATA SOURCES FOR A DATA VISUALIZATION APPLICATION

CROSS REFERENCE TO RELATED APPLICATIONS

This application claims priority to U.S. Provisional Application Ser. No. 62/569,424, filed Oct. 6, 2017, entitled "Identifying Relevant Data Sources and Tables for a Data Visualization Application," which is incorporated by reference herein in its entirety.

TECHNICAL FIELD

The disclosed implementations relate generally to data visualization applications and more specifically to identifying relevant data sources for data analysis.

BACKGROUND

Business questions frequently lead to analysis of data. For example, if an executive wants to know how each of the business units are doing, the answer may be in the form of a data visualization of sales or profit, aggregated by business unit. An analyst probably knows where the sales data is stored, so the task may not be difficult. However, in a large organization, an analyst may not be familiar with all of the available data sources. For example, sales for the new business unit in Africa may be stored in a different database that the analyst is not aware of. In some cases, organizations catalog their data sources, and cataloging can assist with finding appropriate data sources. However, a catalog may be inaccurate, incomplete, or out of date, particularly when an organization has a diverse set of data sources. It can therefore be difficult for an analyst to find the desired data. In addition to personal knowledge and catalogs, some systems provide content-based recommendations based on popularity or "curated" content. Such general-purpose recommendations are likely already known to the analyst, and not helpful to an analyst who has a specific question.

SUMMARY

Given the large amount of information and data that may be available to a user, it may be overwhelming for a user to search through all of the available data sources in order to find data sources that are relevant to the current question. In contrast to methods and tools that rely upon a user's familiarity with relevant content or the accuracy of a catalog (and potentially the skill to compose appropriate search queries), disclosed systems and methods automatically identify and present to the user data sources that are potentially relevant to the current task, thereby improving the user's access to relevant information when there are multiple data sources. In particular, disclosed techniques measure or predict a user's interest in data sources that a user does not or rarely interacts with.

A system identifies relevant data sources. The disclosed methods and systems address the shortcomings of previous methods, and provide a technical effect of improving methods and systems in computer systems. In particular, the methods and systems disclosed herein provide a specific improvement to computer-related technology. The disclosed methods and systems improve existing technology for identifying relevant data sources by measuring and predicting a user's interest or affinity for data sources that the user rarely interacts with, if at all. The disclosed methods and systems solve the technology-centric challenge of identifying data sources that a user generally does not interact with, a problem that specifically arises in the technology centric context of identifying relevant data sources for data visualizations.

The above deficiencies and other problems associated with currently available methods and systems are addressed by the disclosed methods and systems.

In accordance with some implementations, a method of identifying relevant data sources is performed at a server having one or more processors and memory storing one or more programs configured for execution by the one or more processors. The method constructs an interaction matrix whose rows correspond to users and whose columns correspond to data sources. Each entry in the interaction matrix measures the extent to which a respective user interacts with a respective data source according to the respective user's interactions, in a graphical user interface for a data visualization application, with data visualizations generated according to data retrieved from the respective data source. The method forms an initial user matrix and an initial source matrix and iteratively refines the values in the user and source matrices to minimize the difference between the interaction matrix and a matrix produced by multiplying the user matrix and the source matrix. The method also detects a request from a first user to connect to a data server. The request includes an identifier of the first user and the first user corresponds to the kth row of the interaction matrix. In response to the request, for each of a plurality of the data sources, the method uses a vector dot product to compute an affinity score between the kth row of the user matrix and the respective row of the source matrix corresponding to the respective data source. The method selects one or more data sources, from the plurality of data sources, corresponding to high computed affinity scores, and returns the selected data sources to the first user.

The entries in the interaction matrix measure the interaction between users and data sources. A direct way to measure this would be to count the number of times a user writes an SQL query that references a specific data source (e.g., a table in the FROM clause). However, few users interact directly with a data source in this way. Instead, a user interacts with an application, such as a data visualization application, and the data visualization application generates and executes the queries against the data sources. Disclosed implementations therefore measure interaction with data sources indirectly through the data visualization application.

User interactions with data sources can be measured in a variety of ways. In some implementations, measuring the extent to which a respective user interacts with a respective data source is based on the length of time the respective user has spent in the graphical user interface of the data visualization application interacting with data visualizations generated according to data retrieved from the respective data source.

In some implementations, measuring the extent to which a respective user interacts with a respective data source is based on the number of distinct instances where the respective user has created or opened, in the graphical user interface, data visualizations generated according to data retrieved from the respective data source.

In some implementations, measuring the extent to which a respective user interacts with a respective data source is based on the number of distinct data visualizations, generated according to data retrieved from the respective data source, that the respective user has interacted with.

In some implementations, measuring the extent to which a respective user interacts with a respective data source is based on the number of times that the respective user has edited, in the graphical user interface, data visualizations generated according to data retrieved from the respective data source.

In some implementations, measuring the extent to which a respective user interacts with a respective data source is based on the number of times that the respective user has rendered, in the graphical user interface, data visualizations generated according to data retrieved from the respective data source.

In some implementations, measuring the extent to which a respective user interacts with a respective data source is based on the number of times that the respective user has shared, with other users, data visualizations generated according to data retrieved from the respective data source.

In some implementations, measuring the extent to which a respective user interacts with a respective data source is based on measuring complexity of data visualizations generated according to data retrieved from the respective data source, that the respective user has interacted with.

Some implementations combine two or more measures of user interaction using weights. For example, in an implementation with five distinct interaction measures $m_1$, $m_2$, ..., $m_5$, an overall interaction value can be computed as $m=w_1m_1+w_2m_2+ ... +w_5m_5$.

In some implementations, the data sources are stored at the data server.

Because the identified data sources are based on usage of many different users, one or more of the identified data sources may be sources that the user has not interacted with at all. For example, one of the selected data sources can correspond to a column l in the interaction matrix X, where $x_{kl}=0$ (i.e., the user previously had no interaction with this specific data source).

In some implementations, the process ranks the selected data sources according to the affinity scores and returns the selected data sources ordered according to the ranking.

A data source may correspond to an individual table in a database, a predefined query that returns a result set, a stored database view, a result set returned by a stored procedure, an individual sheet within a spreadsheet workbook, an individual CSV file, and so on. A data source has rows of data, with each column corresponding to a distinct data field.

In some instances, a user further refines the scope of interest based on a selection of a specific database or a specific table within a specific database. In some instances, the first user selects a first database, and computing the affinity scores is limited to data sources from the first database. In some instances, the user selects one or more tables from the first database, and computing the affinity scores is limited to data sources that include at least one of the one or more tables. In some instances, the user selects one or more tables from the first database, and computing the affinity scores is limited to data sources that include data from at least one of the one or more tables. In some instances, the user selects one or more tables from the first database, and computing the affinity scores is limited to data sources that are related to at least one of the one or more tables.

In some implementations, the method determines a confidence value for each data source of the plurality of data sources, and determines whether the confidence value exceeds a predefined confidence threshold. When the confidence value exceeds the predefined confidence threshold, the process includes the corresponding data source in the selected one or more data sources. When the confidence value is less than the predefined confidence threshold, the process omits the corresponding data source from the selected one or more data sources.

In accordance with some implementations, a computing device includes one or more processors, memory, a display, and one or more programs stored in the memory. The one or more programs are configured for execution by the one or more processors. The device constructs an interaction matrix whose rows correspond to users and whose columns correspond to data sources. Each entry in the interaction matrix measures an extent to which a respective user interacts with a respective data source according to the respective user's interactions, in a graphical user interface for a data visualization application, with data visualizations generated according to data retrieved from the respective data source. The device forms an initial user matrix and an initial source matrix and iteratively refines the values in the user and source matrices to minimize the difference between the interaction matrix and a matrix produced by multiplying the user matrix and the source matrix. The device detects a request from a first user to connect to a data server. The request includes an identifier of the first user and the first user corresponds to the kth row of the interaction matrix. In response to the request, for each of a plurality of the data sources, the device computes an affinity score between the kth row of the user matrix and the respective row of the source matrix corresponding to the respective data source, using a vector dot product. The device selects one or more data sources, from the plurality of data sources, corresponding to high computed affinity scores, and returns the selected data sources to the first user.

In accordance with some implementations, a non-transitory computer readable storage medium stores one or more programs configured for execution by a computing device having one or more processors, memory, and a display. The one or more programs include instructions for performing any of the methods described herein.

Thus, the disclosed implementations provide users of a data visualization application with specific suggested data sources to answer their questions.

BRIEF DESCRIPTION OF THE DRAWINGS

For a better understanding of the aforementioned systems, methods, and graphical user interfaces, as well as additional systems, methods, and graphical user interfaces that identify relevant data sources, reference should be made to the Description of Implementations below, in conjunction with the following drawings in which like reference numerals refer to corresponding parts throughout the figures.

FIGS. 4A-4E illustrate building an interaction matrix between users and data sources according to some implementations.

FIGS. 5A-5D illustrate forming latent semantic vectors corresponding to users and data sources, in accordance with some implementations

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Data analysis begins by connecting to an appropriate data source. In some cases, a user may not know what data source to open, so implementations identify relevant data sources.

Figure 1:
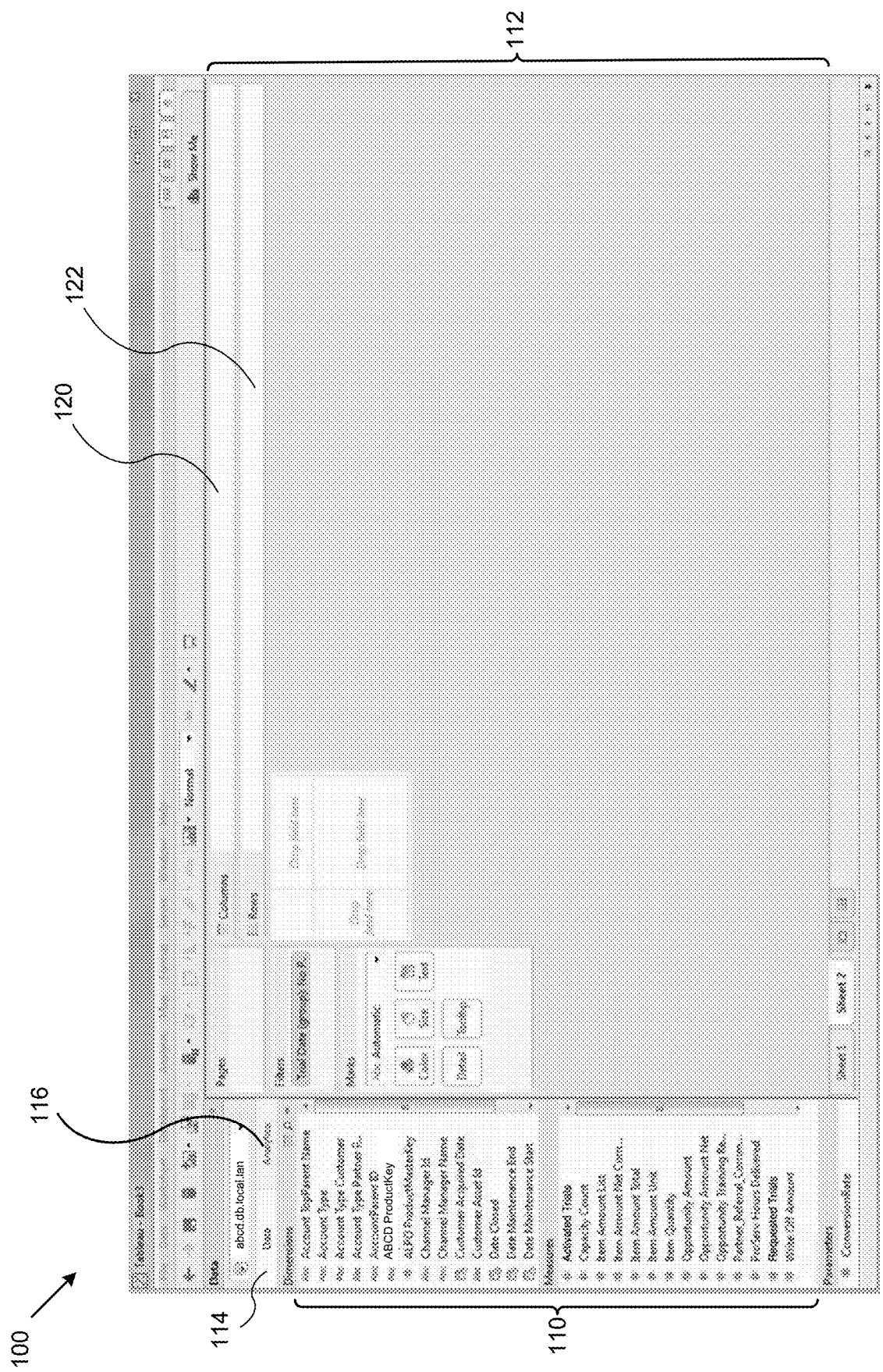
FIG. 1 shows a user interface for a data visualization application in accordance with some implementations.

FIG. 1 shows a data visualization user interface 100 in accordance with some implementations. The user interface 100 includes a schema information region 110, which is also referred to as a data pane. The schema information region 110 provides named data elements (field names) that may be selected and used to build a data visualization. In some implementations, the list of field names is separated into a group of dimensions and a group of measures (typically numeric quantities). Some implementations also include a list of parameters. The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic. Because no data elements have been selected yet, the space initially has no visual graphic.

A user selects one or more data sources 106 (which may be stored on the computing device 200, described below in reference to FIG. 2, or stored remotely), selects data fields from the data sources 106, and uses the selected fields to define a visual graphic. In some implementations, the information the user provides is stored as a visual specification 228 (described below in reference to FIG. 2). In some implementations, the data visualization application 222 includes a data visualization virtual machine (not shown), which takes a data flow graph, and renders a corresponding visual graphic (data visualization). The data visualization application 222 displays the generated graphic in the data visualization region 112.

Figure 2:
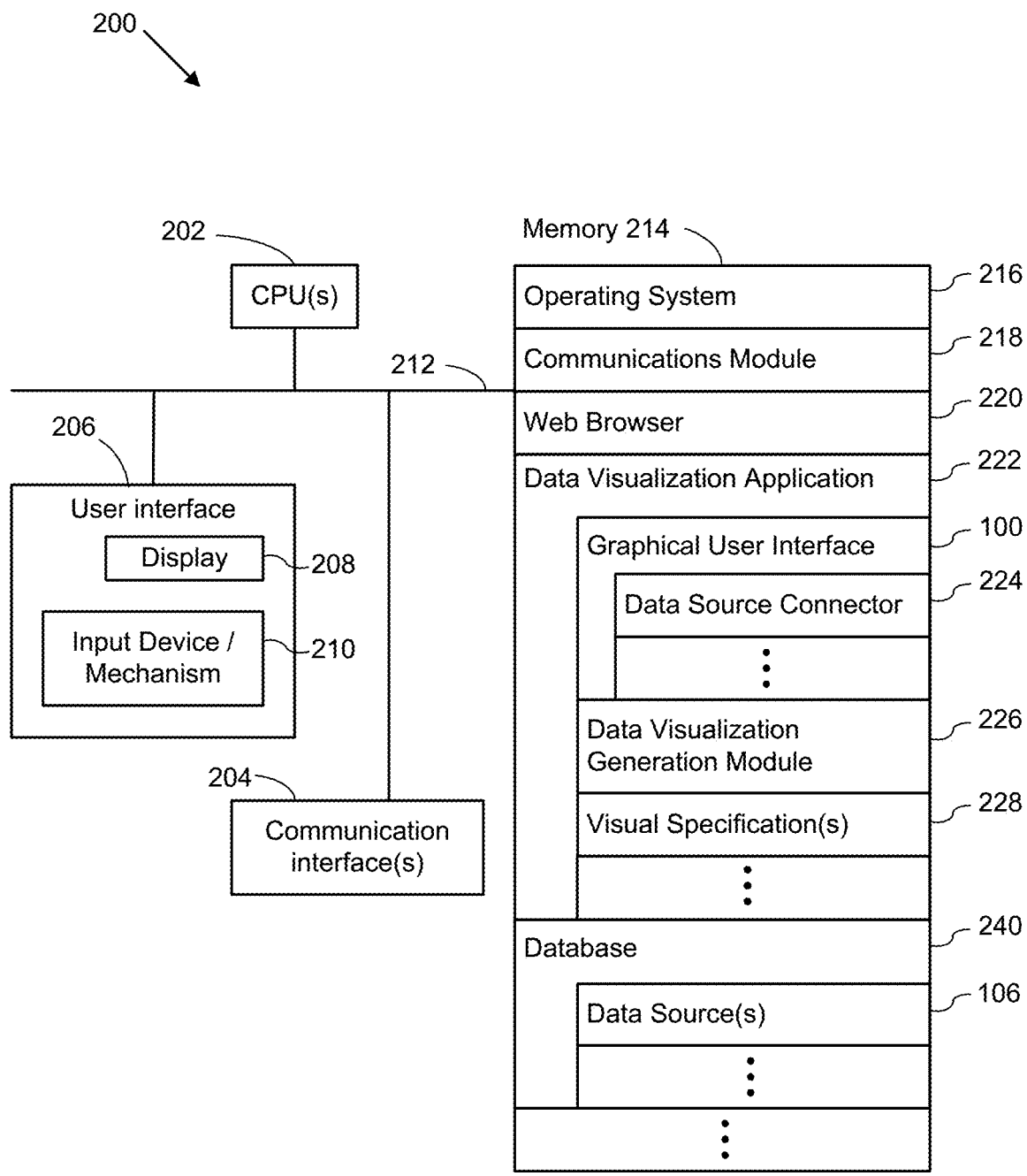
FIG. 2 is a block diagram of a computing device according to some implementations.

FIG. 2 is a block diagram illustrating a computing device 200 that can display a data visualization. A computing device may also display a graphical user interface 100 for the data visualization application 222. Computing devices 200 include desktop computers, laptop computers, tablet computers, and other computing devices with a display and a processor capable of running a data visualization application 222. A computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computing device 200 includes a user interface 206 comprising a display device 208 and one or more input devices or mechanisms 210. In some implementations, the input device/mechanism includes a keyboard; in some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory device(s) within the memory 214, comprises a non-transitory computer-readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communication module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other client application), which enables a user to communicate over a network with remote computers or devices;
- a data visualization application 222, which provides a graphical user interface 100 for a user to construct visual graphics (e.g., an individual data visualization or a dashboard with a plurality of related data visualizations). In some implementations, the data visualization application 222 executes as a standalone application (e.g., a desktop application). In some implementations, the data visualization application 222 executes within the web browser 220 (e.g., as a web application 322). The graphical user interface 100 includes a data source connector 224, which connects users to data sources 106. The data source connector enables users to select known data sources (e.g., using a selection dialog box) and/or provides a list of data sources that may be useful. In some implementations, the suggestions are based on the trained model (e.g., latent user vectors 352 and latent source vectors 354), which uses the combined experience of many users. In some implementations, a user provides some additional information to help narrow the set of identified data sources 106;
- a data visualization generation module 226, which builds data visualizations for a user according to the current visual specification. The generation includes generating appropriate data queries and retrieving data from appropriate data sources;
- visual specifications 228, which are used to define characteristics of a desired data visualization. In some implementations, a visual specification 228 is built using the user interface 100. In some implementations, at least part of the information for a visual specification 228 is stored as a set of visual parameters (e.g., as key-value pairs); and zero or more databases 240, which store data sources 106 and other data used by the data visualization application 222 or data visualization web application 322. In some implementations, the data sources are be stored as spreadsheet files, CSV files, XML files, flat files, or as tables in a relational database.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as functional description of the various features that may be present rather than as a structural schematic of the implementations described herein. In practice, and as recognized by those of ordinary skill in the art, items shown separately could be combined and some items could be separated.

Figure 3:
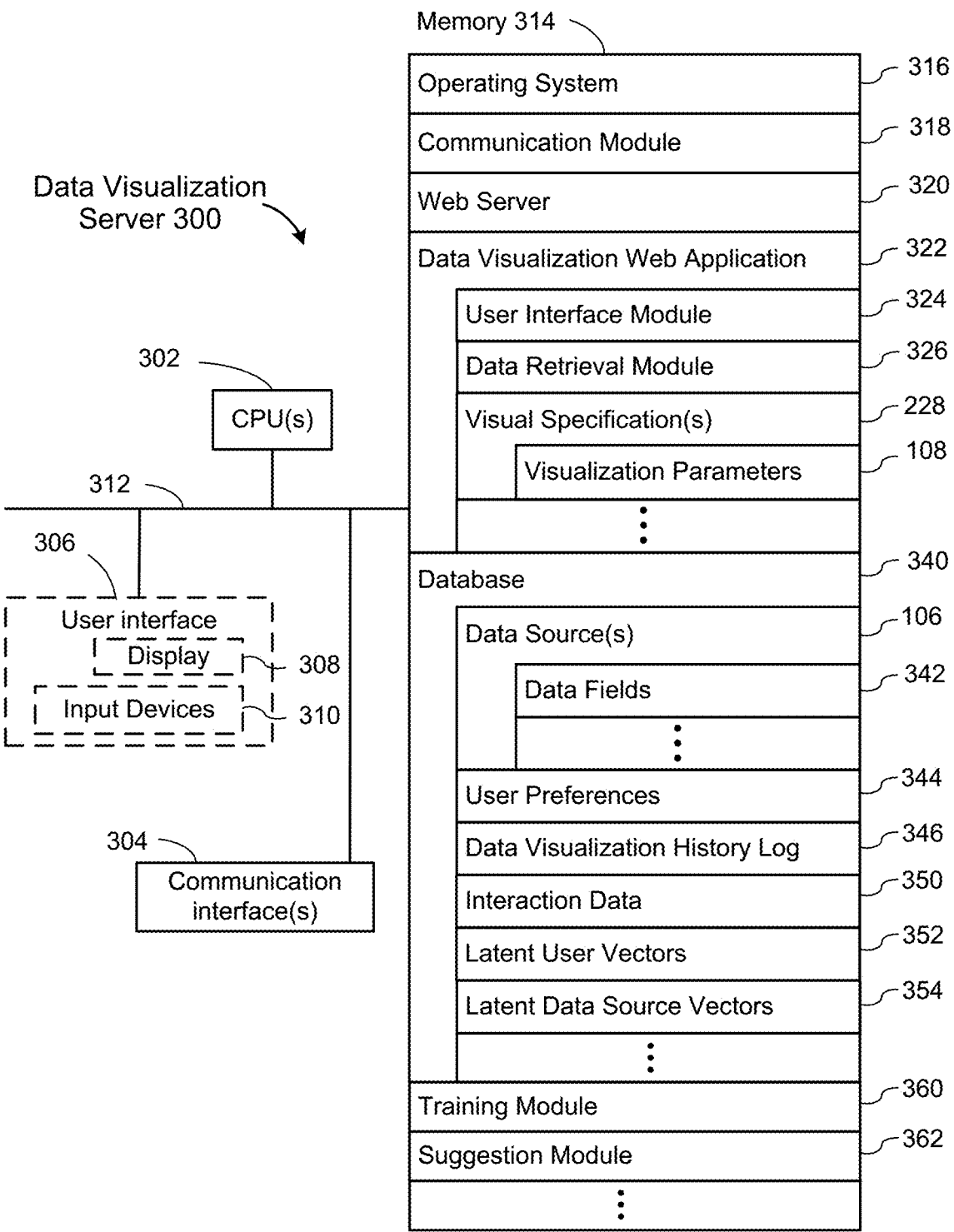
FIG. 3 is a block diagram of a server system in accordance with some implementations.

FIG. 3 is a block diagram of a data visualization server 300 in accordance with some implementations. A data visualization server 300 may host one or more databases 340 and/or provide various executable applications or modules. A server 300 typically includes one or more processing units/cores (CPUs) 302, one or more network interfaces 304, memory 314, and one or more communication buses 312 for interconnecting these components. In some implementations, the server 300 includes a user interface 306, which includes a display device 308 and one or more input devices 310, such as a keyboard and a mouse. In some implementations, the communication buses 312 include circuitry (sometimes called a chip set), which interconnects and controls communications between system components.

In some implementations, the memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternatively the non-volatile memory device(s) within the memory 314, comprises a non-transitory computer-readable storage medium.

In some implementations, the memory 314 or the computer readable storage medium of the memory 314 stores the following programs, modules, and data structures, or a subset thereof:

an operating system 316, which includes procedures for handling various basic system services and for performing hardware dependent tasks;

a network communication module 318, which is used for connecting the server 300 to other computers via the one or more communication network interfaces 304 (wired or wireless) and one or more communication networks, such as the Internet, other wide area networks, local area networks, metropolitan area networks, and so on;

a web server 320 (such as an HTTP server), which receives web requests from users and responds by providing responsive web pages or other resources;

a data visualization web application 322, which may be downloaded and executed by a web browser 220 on a user's computing device 200. In general, a data visualization web application 322 has the same functionality as a desktop data visualization application 222, but provides the flexibility of access from any device at any location with network connectivity, and does not require installation and maintenance. In some implementations, the data visualization web application 322 includes various software modules to perform certain tasks. In some implementations, the web application 322 includes a user interface module 324, which provides the user interface for all aspects of the web application 322. In some implementations, the web application includes a data retrieval module 326, which builds and executes queries to retrieve data from one or more data sources 106. The data sources 106 may be stored locally on the server 300 or stored in an external database 340. In some implementations, data from two or more data sources may be blended. In some implementations, the data retrieval module 326 uses a visual specification 228 to build the queries. In some implementations, all or part of a visual specification is saved as a set of visualization parameters 108, as described above with respect to FIG. 2; and one or more databases 340, which store data used or created by the data visualization web application 322 or data visualization application 222. The databases 340 may store data sources 106, which provide the data used in the generated data visualizations. A typical data source 106 has a plurality of data fields 342. In some implementations, the databases 340 store user preferences 344 for data visualization. In some implementations, the databases 340 include a data visualization history log 346. In some implementations, the history log 346 tracks each time a data visualization is rendered. The database 340 also store data used by the training module 360 and the suggestion module 362.

The databases 340 may store data in many different formats, and commonly include many distinct tables, each with a plurality of data fields 342. Some data sources comprise a single table. The data fields 342 include both raw fields from the data source (e.g., a column from a database table or a column from a spreadsheet) as well as derived data fields, which may be computed or constructed from one or more other fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields 342 are stored separately from the data source 106. In some implementations, the database 340 stores a set of user preferences 344 for each user. The user preferences may be used when the data visualization web application 322 (or application 222) makes recommendations about how to view a set of data fields 342 or what data sources may be relevant. In some implementations, the database 340 stores a data visualization history log 346, which stores information about each data visualization generated. In some implementations, the database 340 stores other information, including other information used by the data visualization application 222 or data visualization web application 322. The databases 340 may be separate from the data visualization server 300, or may be included with the data visualization server (or both).

In some implementations, the data visualization history log 346 stores the visual specifications selected by users, which may include a user identifier, a timestamp of when the data visualization was created, a list of the data fields used in the data visualization, the type of the data visualization (sometimes referred to as a "view type" or a "chart type"), data encodings (e.g., color and size of marks), the data relationships selected, and what connectors are used. In some implementations, one or more thumbnail images of each data visualization are also stored. Some implementations store additional information about created data visualizations, such as the name and location of the data source, the number of rows from the data source that were included in the data visualization, version of the data visualization software, and so on.

In some implementations, the history log 346 tracks various ways that users interact with the data visualization applications 222 and 322. For example, the history log can track each instance of opening or creating a data visualization, track each edit to a data visualization configuration, track length of time interacting with a data visualization, track each time a data visualization is rendered, track data visualization comments read or written about a data visualization, and/or track when a user shares a data visualization with other users.

A training module 360 uses collected information about data sources 106 in order to train a model for identifying relevant data sources. The training module 360 collects and stores interaction data 350 (e.g., as an interaction matrix), which quantifies how much each user interacts with each data source. In some implementations, the interaction data 350 is built (at least in part) from the history log 346. The training module uses an iterative process to construct latent user vectors 352 and latent data source vectors 354, as described in more detail below. The latent vectors typically have 5-50 components (the same size for all vectors). Each vector component of the latent vectors corresponds to an "attribute" or "factor." There is no a priori meaning associated with these latent attributes.

Using the constructed latent user vectors 352 and latent data source vectors 354, the suggestion module 362 is able to identify relevant data sources 106 for any specific user. Each user corresponds to a specific latent user vector 352. By computing a dot product of a specific latent user vector 352 with various latent data source vectors 354, the suggestion module 362 measures the affinity between the specific user and the data sources. In some instances, the data sources tested are limited to those that satisfy other criteria (e.g., data sources in a specific database or having at least one data field 342 matching a keyword entered by the user). Data sources 106 having the highest computed affinity to the user are the ones presented to the user as potentially relevant data sources.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. Furthermore, the memory 314 may store additional modules or data structures not described above.

Although FIG. 3 shows a data visualization server 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 300 may be stored or executed on a computing device 200. In some implementations, the functionality and/or data may be allocated between a computing device 200 and one or more servers 300. Furthermore, one of skill in the art recognizes that FIG. 3 need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically co-located (e.g., the individual physical devices could be spread throughout the United States or throughout the world).

FIGS. 4A-4E illustrate interaction data according to some implementations. The table 400 in FIG. 4A associates data sources 404 with workbooks 402. A workbook can be associated with one or more data sources 404. As illustrated in FIG. 4A, multiple workbooks 402 can utilize the same data source 404. A single workbook 402 may also be associated with multiple data sources 404. A workbook can have multiple sheets, where each sheet is associated with its own data sources and each sheet displays its own data visualization.

FIG. 4B provides a table 410, which shows the interaction between users 414 and data visualization workbooks 412. In this example, the interaction is measured by the number of views 416 (e.g., opening a data visualization workbook or rendering the data visualizations for a workbook). In some implementations, a user's interaction with a workbook includes other factors as well, including: the number of times that a user views a data visualization defined in a workbook sheet, the number of times a user has published the workbook, how long ago a user last viewed the workbook, the duration of time that a user viewed a workbook, and the number of times a user edited the workbook. In this example, user 1 has viewed workbook wb1 seventeen times (422), has viewed workbook wb2 one time (424), and has viewed workbook wb3 ten times (426)

FIG. 4C provides a table 430, which is an interaction matrix constructed from the tables 400 and 410 in FIGS. 4A and 4B. The interaction between a user and a data source is measured based on the interaction between a user and a data visualization workbook that uses the data source. A workbook and a data source are associated with one another when the workbook includes data from the data source (e.g., the data visualization for the workbook is generated based on data retrieved from the data source). In some implementations, a workbook uses data from more than one data source. As illustrated in FIG. 4C, the interaction data is aggregated by user and data source. Each row in the interaction matrix 430 corresponds to a user (e.g., user 1 (440)), and each column corresponds to a single data source (e.g., the first column 432 corresponds to the first data source ds1 and the second data source 434 corresponds to the second data source ds2). The (user 1, ds1) entry 442 has the value 18 based on the interactions of the first user with workbook wb1 (17 views (422)) and interactions with workbook wb2 (1 view (424)). The (user 1, ds2) entry 444 has the value 10 based on the interaction of the first user with the workbook wb3 (ten views (426)).

FIG. 4D is a raw data extract 450 of user interactions with data visualization workbooks (e.g., aggregated from the data visualization history log 346). Each row in the extract 450 corresponds to a unique combination of user_id 452 and viz_id 454. The user_id 452 uniquely identifies the user and the viz_id 454 uniquely identifies the data visualization. Each viz_id 454 corresponds to a single workbook_id 456 (but a single workbook_id 456 is associated with multiple viz_id's 454 when the workbook has multiple sheets). The raw extract 450 here also includes the visualization title (viz_title) 458. For each (user_id, viz_id) pair, there is a view_count 460, which specifies the number of views of the data visualization by the user.

FIG. 4E provides an example of an interaction matrix 470. The interaction matrix 304 has m rows corresponding to m users 472-1, 472-2, . . . 472-*m*, and has n columns corresponding to n data sources 474-1, 474-2, . . . , 474-*n*. Each element of the interaction matrix 470 provides a measure of a user's interaction with a specific data source. For example, the element 476 quantifies the level of interaction between user 2 (472-2) and data source ds2 (474-2). The value 3.0 for element 476 may indicate that the second user 472-2 has viewed data visualizations that use the second data source 474-2 three times. Note that an interaction matrix is sparse. For example, if there are 100 users and 100 data sources, there are 10,000 matrix entries. Of these, a small percentage have non-zero values (e.g., 500 non-zero entries).

Figure 5C:
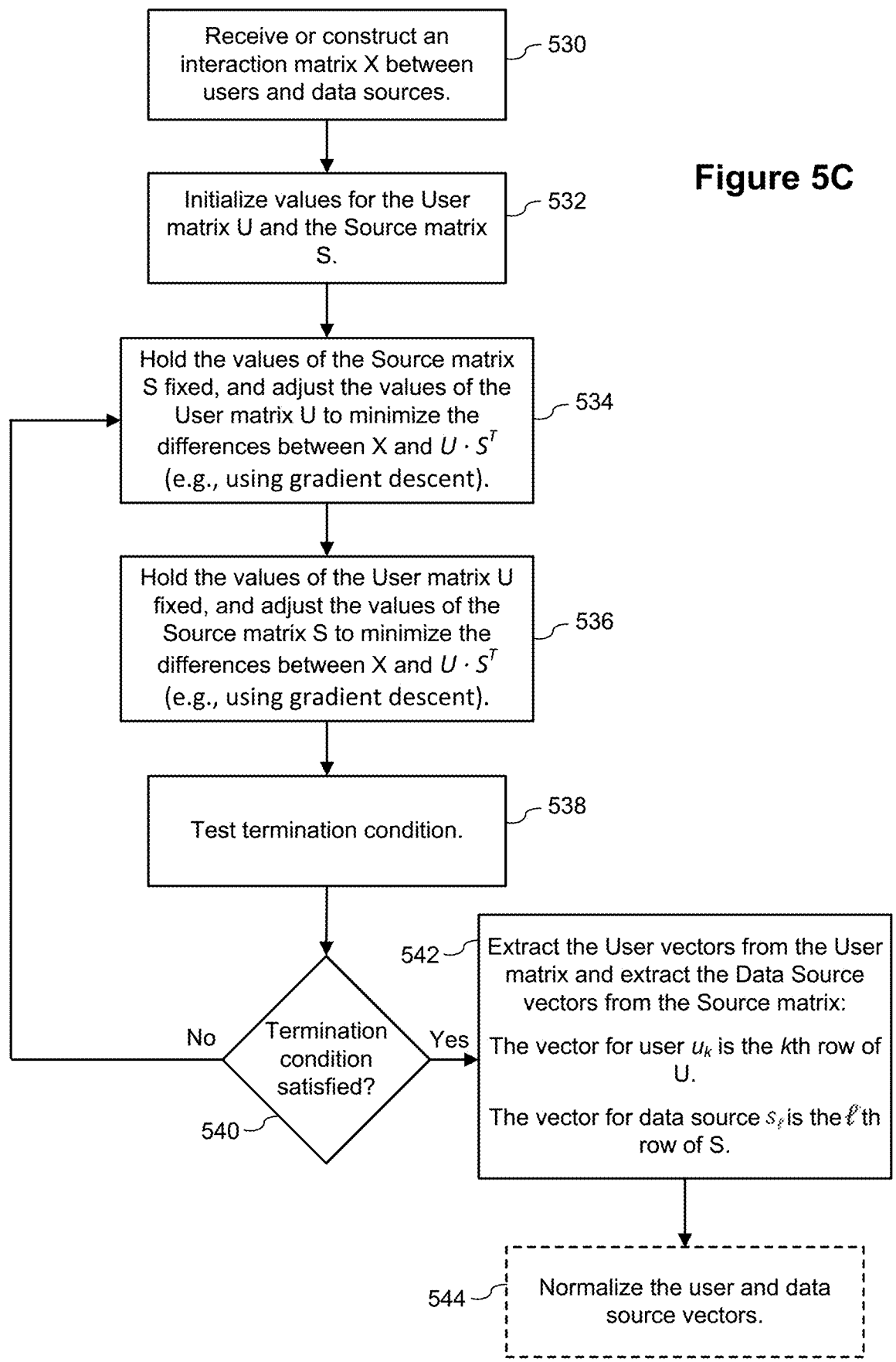

FIGS. 5A-5C illustrate a process for computing latent vectors corresponding to each user and each data source. The latent vectors express each user or data source as a linear combination of latent attributes (or "factors"). The number of latent attributes is selected (e.g., 5 attributes, 10 attributes, 20 attributes, or 50 attributes), but the process does not assign a predefined meaning to these attributes. In FIGS. 5A-5C, the number of attributes is designated as r. Note that the same attributes apply to both users and data sources. The process shown in FIGS. 5A-5C can be reapplied, and typically is, in order to update the trained model with more data. In some implementations, the process is reapplied at a predefined interval, such as once a day, once a week, or once a month. In some implementations, an administrator can initiate the process manually as desired.

As illustrated in FIG. 5A, the goal is to express the interaction matrix X 502 as a product of a user matrix U 504 and the transpose of a data source matrix S 506. In the user matrix U, each row represents a unique user, and in the data source matrix S, each row represents a unique data source. The data source matrix S is transposed to make the multiplication work. As illustrated in FIG. 5A, each column of $S^T$ represents a data source.

As illustrated in FIG. 5A, the goal is for each entry $x_{ij}$ 510 in the interaction matrix X to match the product of the ith row U 512 of the user matrix U and the jth column $S_j^T$ 514 of the data source matrix S. The difference $x_{ij} - U_i S_j^T$ 520 is the error for the (i, j) entry. The process described below minimizes the squared errors 522 for all of the entries, which is $$\sum_{i=1}^{m}\sum_{j=1}^{n}(x_{ij} - U_i S_j^T)^2$$

The process begins by receiving (530) or constructing (530) an interaction matrix 502. The data in the interaction matrix measures interactions between users and data sources indirectly based on user interactions with a data visualization application. When a data visualization workbook uses a data source to generate a data visualization in the data visualization application, a user's interaction with that workbook quantifies the user's interaction with the data source. As noted above, the quantification can be measured in a variety of ways, such as data visualization views (e.g., generating the data visualization), time spent in the data visualization application with a specific data visualization, the number of user interface events (e.g., clicks or finger gestures), the extent the user shares the data visualization with others (e.g., by publishing), the amount of collaboration (e.g., comments) the user reads or writes about the data visualization, the complexity of the data visualization, how recently the user has accessed the data visualization, the frequency with which the user has accessed the data visualization, viewing a data source description, editing a data source, and so on.

The process initializes (532) the values for the user matrix U and the source matrix S. Typically, the initial values are generated randomly (e.g., in the range of 0 to 1). The process then applies a pair of steps to adjust the entries in the user matrix U and the source matrix S. In the first step 534, the process holds the values of the source matrix S fixed and adjusts the values of the user matrix U to minimize the total error 522. In some implementations, this uses gradient descent. In the second step 536, the roles are reversed. The process holds the values of the user matrix U fixed, and adjusts the values of the source matrix S to minimize the total error 522. In some implementations, the process uses gradient descent to make the adjustments.

After the user matrix U and the source matrix S have been adjusted, the process tests (538) one or more termination criteria. In some implementations, the termination criteria compares the total error 522 to a threshold error limit. In some implementations, the termination criteria compares the total error from the current iteration to the total error from the previous iteration. In some implementations, the termination criteria counts the total number of iterations that have been performed. In some implementations, the termination criteria include comparing the total error 522 from the current iteration to the total error from two or more previous iterations.

The process determines (540) if any of the termination criteria are satisfied. If none of the termination criteria are satisfied, the process repeats the adjustment steps 534 and 536. If one or more of the termination criteria are satisfied, the process saves the user matrix U and the source matrix S. In some implementations, the user matrix U is stored as a set of latent user vectors 352, and the source matrix S is stored as a set of latent data source vectors 354. These latent vectors 352 and 354 form the trained model according to the interaction matrix X. In some implementations, the latent vectors are normalized (544) (e.g., by dividing each vector by its length).

In some implementations, the latent user vectors 352 and latent data source vectors 354 are calculated using variations of the method illustrated in FIG. 5C. For example, Some implementations express the interaction matrix as a product $X = U \cdot D \cdot S^T$, where X, U, and S are as above, and D is a diagonal (r×r) matrix. In some implementations, the process uses singular value decomposition.

In some implementations, confidence values are computed for each of the users and/or data sources. When there is insufficient data to be confident about a user, some implementations turn off the process that identifies relevant data sources. For example, a user who has only been using the data visualization application for a couple of days may not have enough history to guarantee a high probability for suggested data sources. Similarly, for a new data source, there may be inadequate usage, and therefore insufficient information about what users are likely to access that data source. Such data sources may be excluded. In some implementations, the system excludes a user or data source by not saving a corresponding latent vector in the database.

FIG. 5D provides the source code used in some implementations for adjusting the values in the user matrix U and the source matrix S.

Figure 5E:
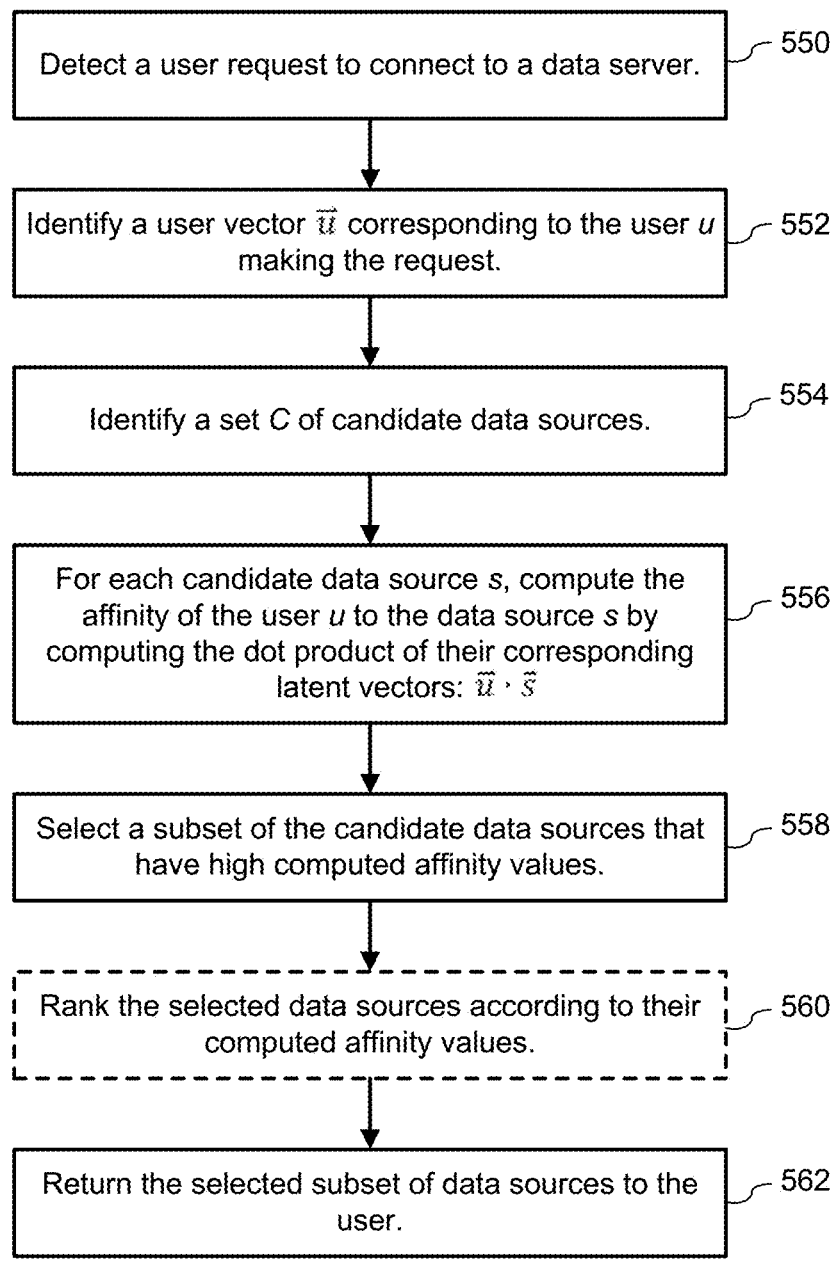
FIG. 5E illustrates using a trained model to identify relevant data sources for a user according to some implementations.

FIG. 5E illustrates using the computed latent user vectors 352 and the latent source vectors 354 to provide a specific user with data source suggestions. This process starts by detecting (550) a user request to connect to a data server. A single data server can host many databases, so it can be helpful to provide the user with some suggestions based on past usage.

The process identifies (552) a latent user vector $\vec{u}$ 352 corresponding to the user making the request. Typically, an identifier of the user is included in the request or is indirectly referenced by the request. The process then identifies (554) a set C of candidate data sources. The set C of candidate data sources is typically limited in one or more ways. First, the set of candidates is limited based on what the user has already selected. If the user has only selected a data server, then all data sources on the data server are potential candidates. If the user has selected a specific database at the data server, then the data sources are limited to those from the selected database. (In some cases there are data sources that include data from two or more databases, in which case a data source would be considered a candidate if any of the data for the data source is from the user selected database.) If the user has selected a specific table from a database, the data sources are limited to those that include at least some data from the selected table. In some implementations, the user can also supply one or more keywords, and the set of candidate data sources is limited to those matching (e.g., fuzzy matching) one or more of the user-provided keywords. In addition to limiting the candidates based on what the user has selected, some implementations also apply a sampling process when the number of candidates is too large to process quickly. In some implementations, a sample of the candidate data sources is evaluated initially (e.g., synchronously), and a larger set (e.g., all of the candidates) is run as a background asynchronous process.

For each candidate data source s, the process computes (556) the affinity of the user u to the data source s. Because both user vectors 352 and data source vectors 354 use the same attributes, a dot product $\vec{u} \cdot \vec{s}$ of the vectors is a convenient way to measure the affinity. The process selects (558) a subset of the candidate data sources that have high computed affinity values. In some implementations, "high affinity" is measured by having an affinity that exceeds a predefined threshold. In some implementations, "high affinity" is attained by being within a certain percentile ranking (e.g., top 5%) among all of the computed affinities. In some implementations, "high affinity" also requires being sufficiently greater than other computed affinities (e.g., affinity in the top 5% and having a magnitude that is a predefined amount greater than the affinities on the bottom 95%). In some implementations, "high affinity" means the data sources with the top N affinity values, where N is a predefined positive integer (e.g., 3). Some implementations apply multiple factors to make a determination of high affinity.

In some implementations, the process ranks (560) the selected data sources according to their computed affinity values. In some of these implementations, the ranking is part of the selection process (e.g., the highest ranked data sources are the ones selected). Finally, the selected subset of data sources (e.g., identifiers of the data sources) is returned to the user. When ranking is applied, the data sources are returned in ranked order.

FIGS. 6A-6F illustrate a graphical user interface for connecting to data sources in accordance with some implementations.

Figure 6A:
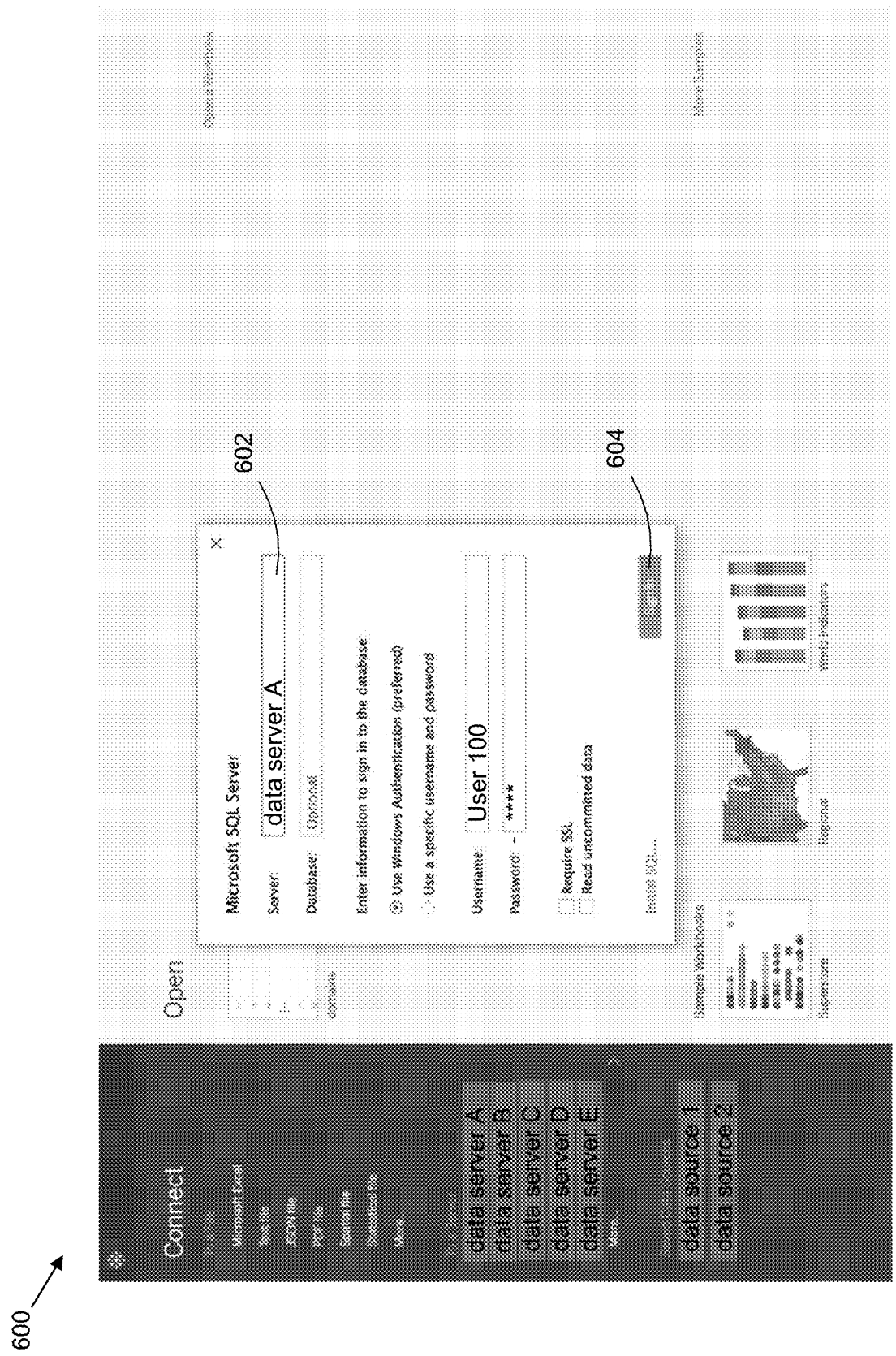
FIGS. 6A-6F are screenshots of a graphical user interface for providing users with relevant data sources in accordance with some implementations.

FIG. 6A shows a starting page of a user interface 600 that allows a user to connect to a data server and log in. In some implementations, the user interface 600 is a graphical user interface for a data visualization application. For example, as shown in FIG. 6A, a user has selected data server A 602 and entered user information (e.g., username, password) corresponding to User 100 into the user interface 600 at a client device 200. Once the user selects the "sign in" button 604, a login request and a request to connect to data server A is transmitted to the server 300. In some implementations, identifying information for the user (e.g., User 100) is included in the request.

Figure 6B:
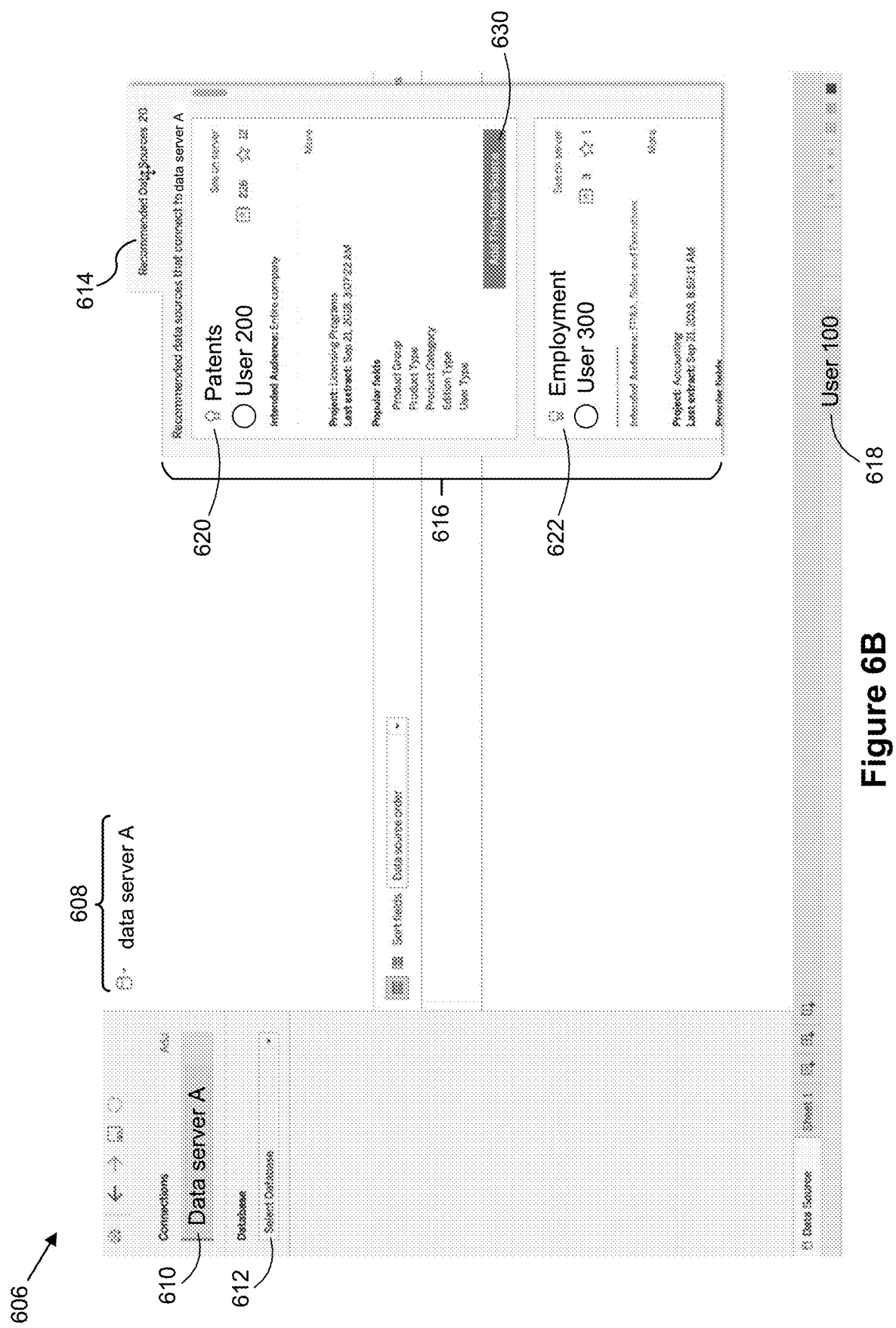

FIG. 6B shows a user interface 606 that allows a user to select from identified relevant data sources. In some implementations, the user interface 606 is a graphical user interface for a data visualization application. The user interface 606 includes a connections selector 610, a connection indicator 608, a database selector 612, a user indicator 618, and a recommendations tab 614. The connections selector 610 shows what data server the user is currently connected to. In some implementations, a user can add or remove connections from the connections selector 610. The connection indicator 608 shows what server, database, and/or tables the user is currently connected to. The database selector 612 allows a user to select and connect to databases at the selected servers. The user indicator 618 shows which user is currently logged in. The recommendations tab 614 shows the data sources that are currently recommended. The recommendations panel 616 can be displayed by selecting (e.g., clicking or hovering a pointer over) the recommendations tab 614. In some implementations, as shown, the recommendations panel 616 is a pop-up window or a pop-up menu. The user interface shows that User 100 is currently connected to data server A (shown by connections indicator 608) and there are currently 20 recommended data sources (as indicated in the header of the recommendations tab 614). When the user selects the recommendations tab 614, the recommendations panel 616 is expanded. In some implementations, as shown, the recommendations panel 616 is scrollable and shows a brief summary of each data source. In this example, the first recommended data source 620 is titled Patents. In this example, the summary shows that Patents data source was published by User 200. The summary also includes other information regarding the recommended data source, such as the project that the data source is connected to and popular fields in this data source. The summary also includes a button 630, which allows the user to select and add the recommended data source to the user's current work space and/or workbook. In some implementations, the recommended data sources are displayed in the recommendations panel 616 in order based on ranking. For example, the first recommended data source 620 is the top ranked recommendation and the second ranked recommendation is shown as the second recommended data source 622.

Figure 6C:
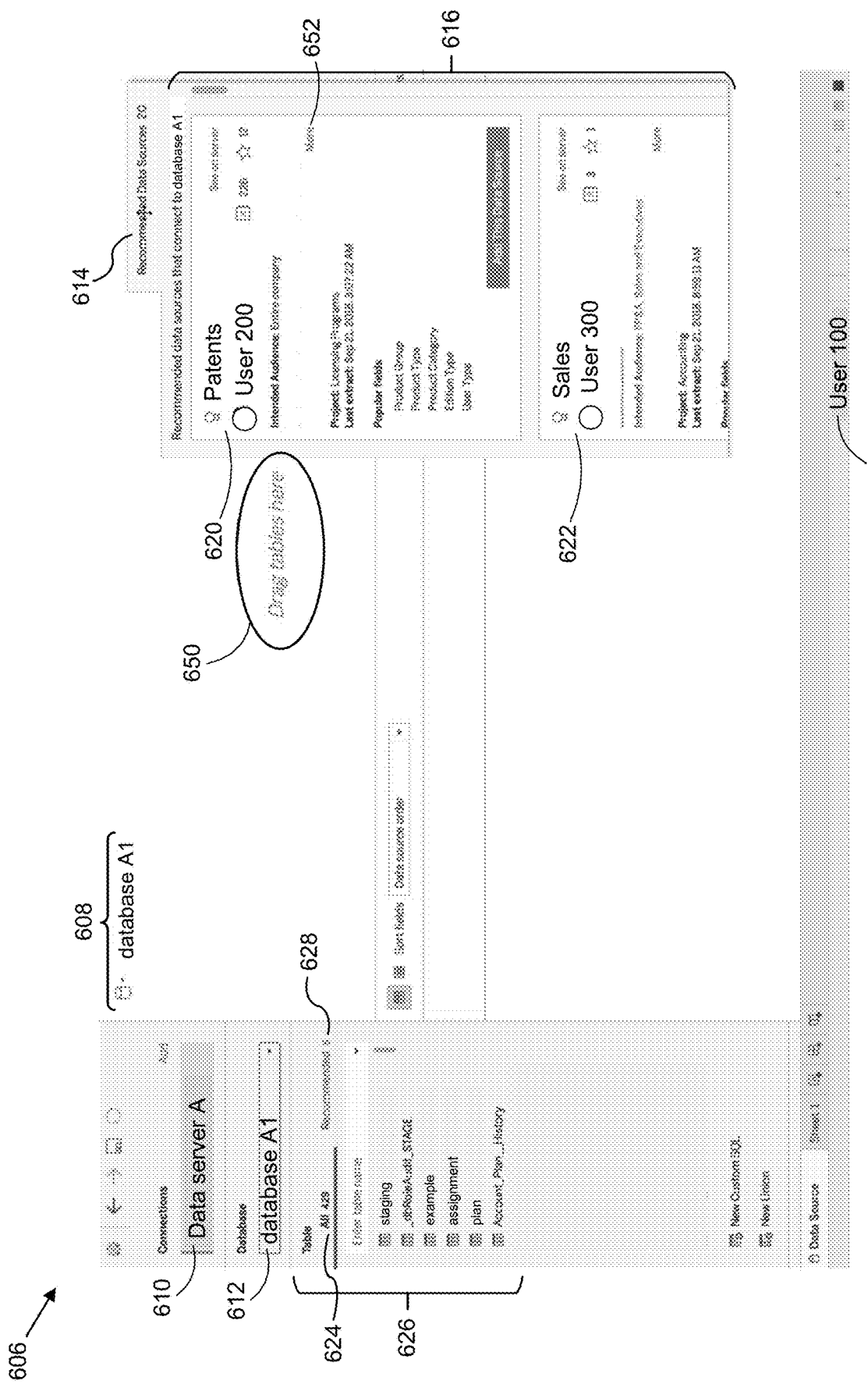

Referring to FIG. 6C, the user interface 606 has been updated based on the user's selection of a database. In response to the user's selection of a database, the user interface 606 includes a table panel 626, which includes an All Tables tab 624 and a Recommended Tables tab 628, which allow a user to view all available tables or to view currently recommended tables. The table panel 626 allows a user to search for and select one or more tables to be added to the user's current workspace and/or workbook or for viewing. In some implementations, as shown, a user can drag one or more tables onto the workspace in order to add the data table to the workspace and/or workbook. Some implementations indicate this option by displaying a "Drag Tables Here" label 650 in the user interface. Recommendations are updated based on the user's selection of a database, restricting the data sources to those that whose data is stored in the selected database. For example, as shown in FIG. 6C, the database selector 612 shows that the user has selected database A1. The connections indicator 608 has been updated to show that User 100 is connected to database A1. The table panel 626 displays a list of tables available for the user to select. In this example, there are 429 tables available and there are 5 recommended data tables. Because the user is currently under the All Tables tab 624, a list of all of the available data tables (e.g., staging, sbRoleAudit_STAGE, example, assignment, plan, and account_plan_history) are displayed. The scroll bar allows selection of other tables. In some cases, only data tables that are associated with the database A1 on data server A are displayed. In some implementations, as shown, the list of tables is scrollable. Recommendations have also been updated based on the user's selection of database A1. As shown in the recommendations panel 616, the recommended data sources only include data sources that are associated with (e.g., have data from) the database A1. For example, the recommendations panel 616 now shows that the second recommendation 622 is a data source titled Sales. Previously, the second recommended data source 622 (as shown in FIG. 6B, before database A1 was selected), was a data source titled Employment.

Figure 6D:
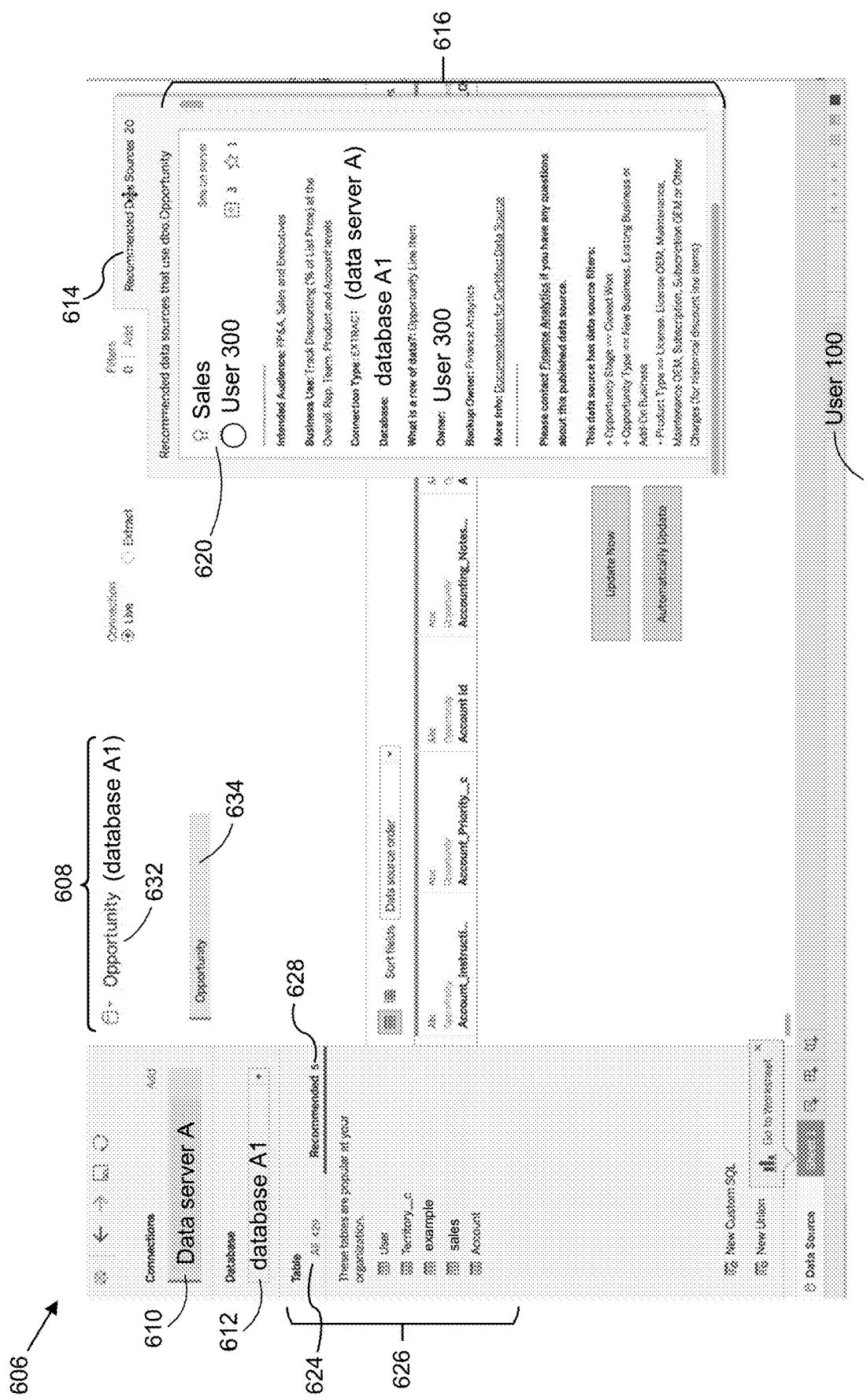

Referring to FIG. 6D, the user interface 606 has been updated based on the user's selection of a data table (the table "Opportunity"). In response to the user's selection of a data table, the user interface 606 includes a table indicator 634 for the Opportunity table. The user interface 606 also updates the connections indicator 608 to show that the user is connected to the selected data table. The recommendation tab is also updated, using the more limited set of candidate data sources, as described above in box 554 of FIG. 5E. As shown in FIG. 6D, the user has selected the data table Opportunity and added this table to the current workspace and/or workbook. The recommendations have been updated to include only data sources that are associated with data server A, database A1, and the Opportunity table. The table Sales is now the first recommendation in the recommendation panel 616. In this example, the user has selected the "more" link 652 in the user interface (see FIG. 6C) to expand the first recommended data source 620, thereby showing more information regarding this data source. FIG. 6D also shows that the user has selected the Recommended Tables tab 628. The table panel 626 shows the 5 recommended tables (i.e., User, Territory_c, example, sales, and Account).

Figure 6E:
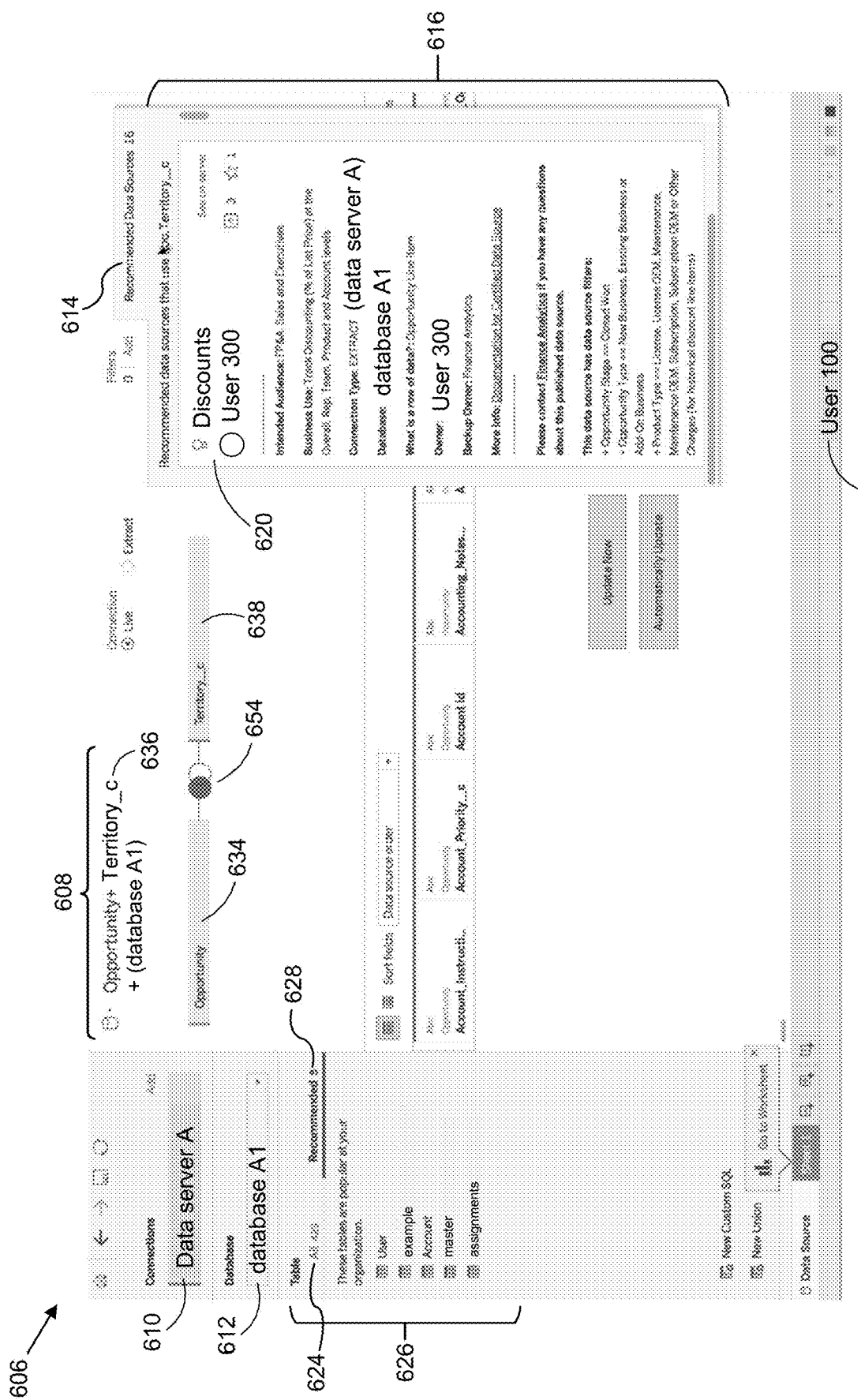

Referring to FIG. 6E, the user interface 606 has been updated based on the user's selection of a second data table ("Territory_c"). In response to the user's selection of the Territory_c table, a corresponding table indicator 638 is displayed and the connections indicator 608 is updated to display the Territory_c table 636 as well. Recommendations are also updated in response to the user's selection. For example, as shown in FIG. 6E, the user has selected the Territory_c table and added this table to the current workspace and/or workbook. In this example, the user has joined the Opportunity table to the Territory_c table, as indicated by the first join icon 654. The recommendations have been updated to include only data sources that are associated with data server A, database A1, and the Territory_c table. In some implementations, the recommendations are updated to include only data sources that are associated with data server A, database A1, the Opportunity table and the Territory_c table. The recommendations tab 614 indicates that the updated list of recommended data sources includes 16 recommended data sources (fewer than the 20 recommended data sources shown in FIGS. 6C and 6D, before the Territory_c table was selected). The table Discounts is now the first recommendation 620. The recommended list of tables (i.e., User, example, Account, master, and assignments), displayed in the table panel 626, has been updated based on the user selection of the data table titled Territory_c.

Figure 6F:
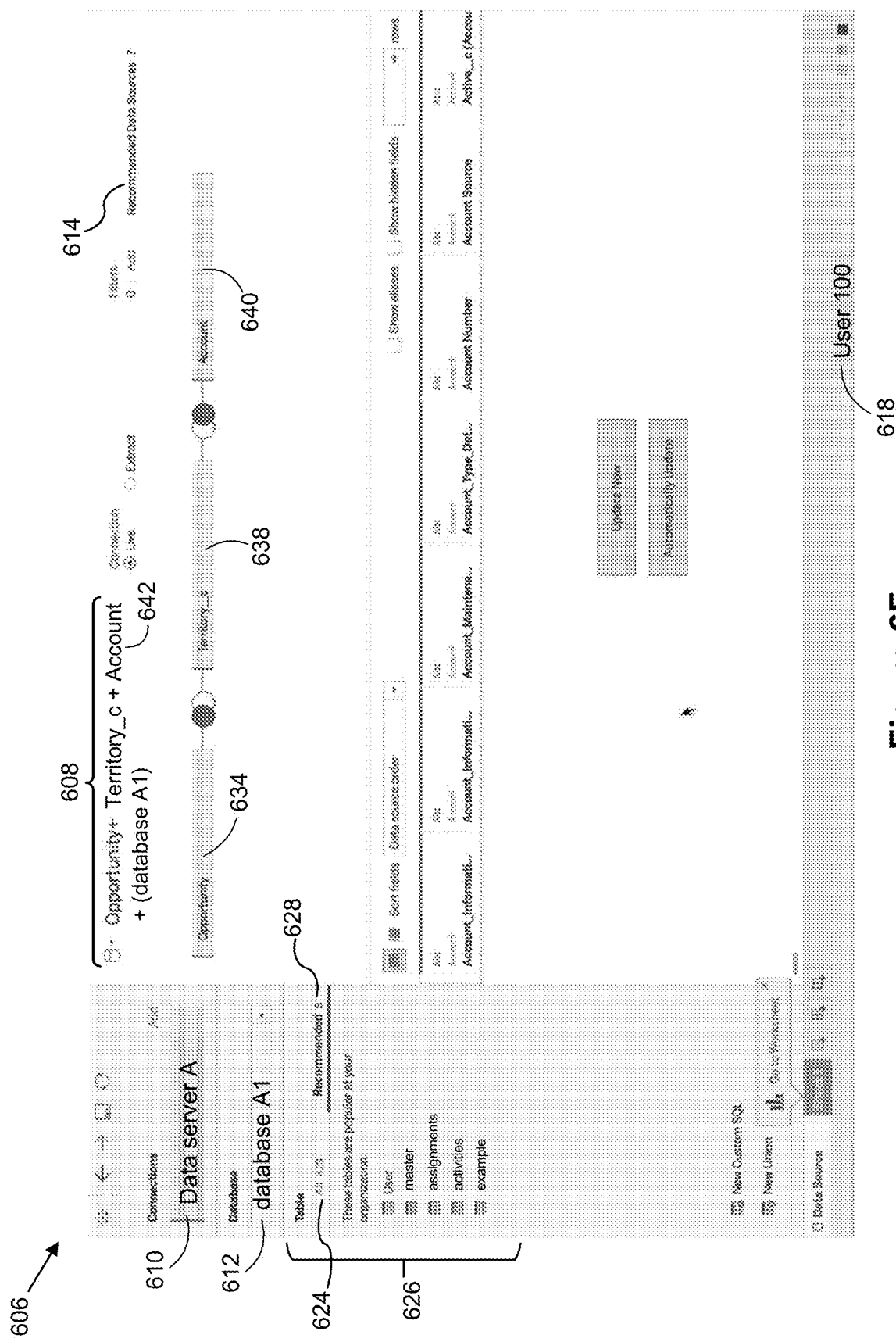
Figure 7A:
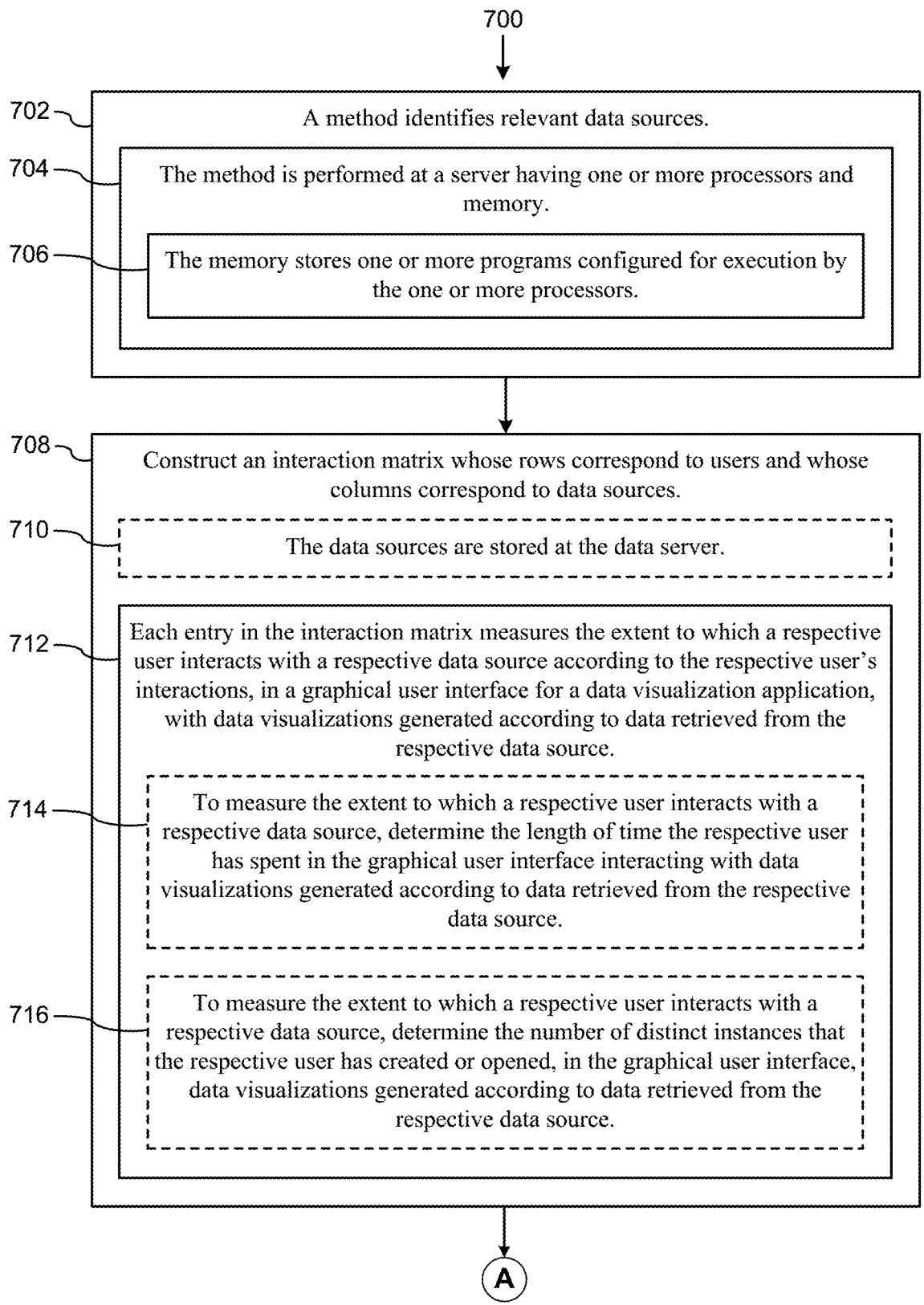
FIGS. 7A-7D provide a flowchart for identifying relevant data sources in accordance with some implementations.
Figure 7B:
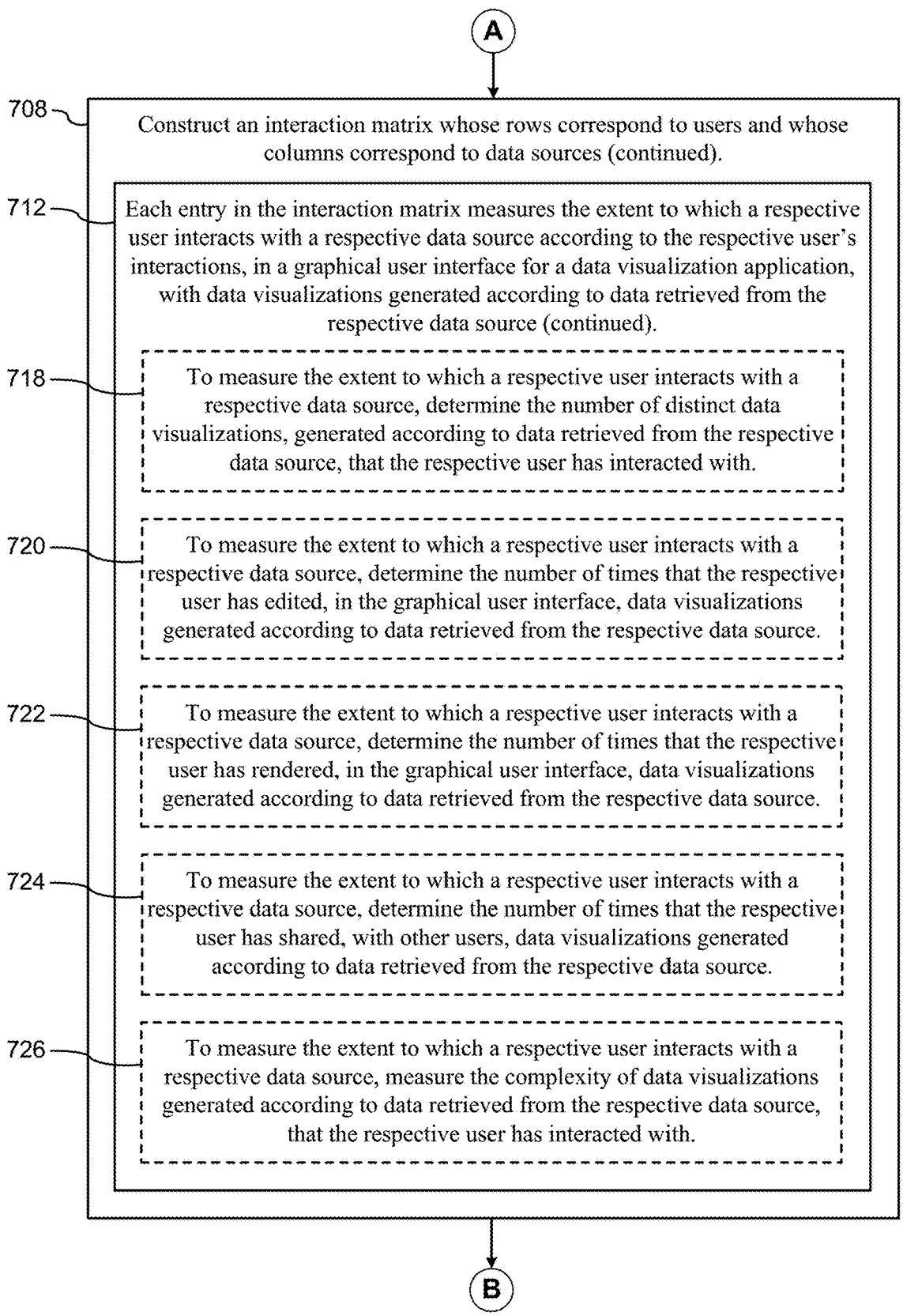
Figure 7C:
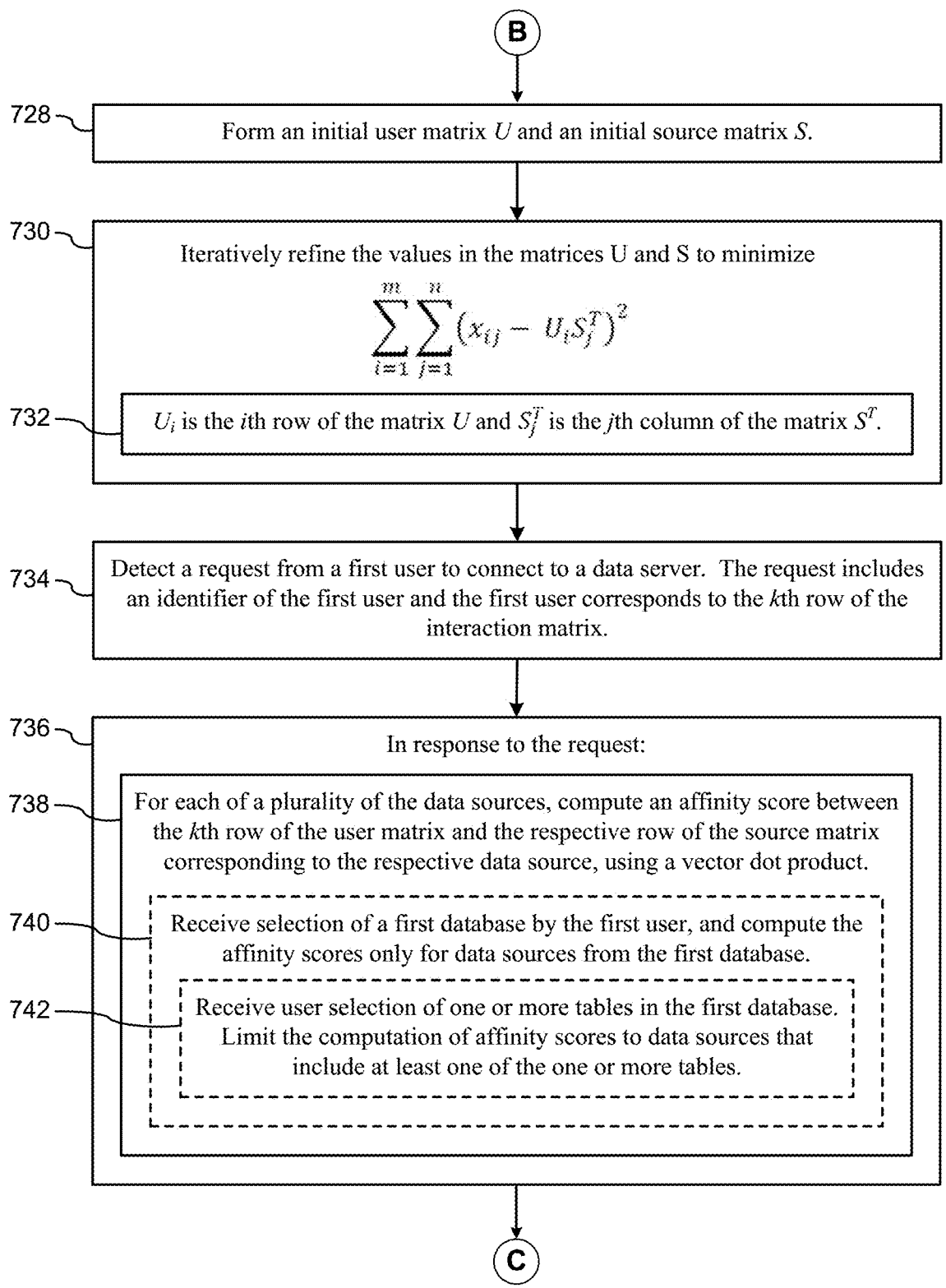
Figure 7D:
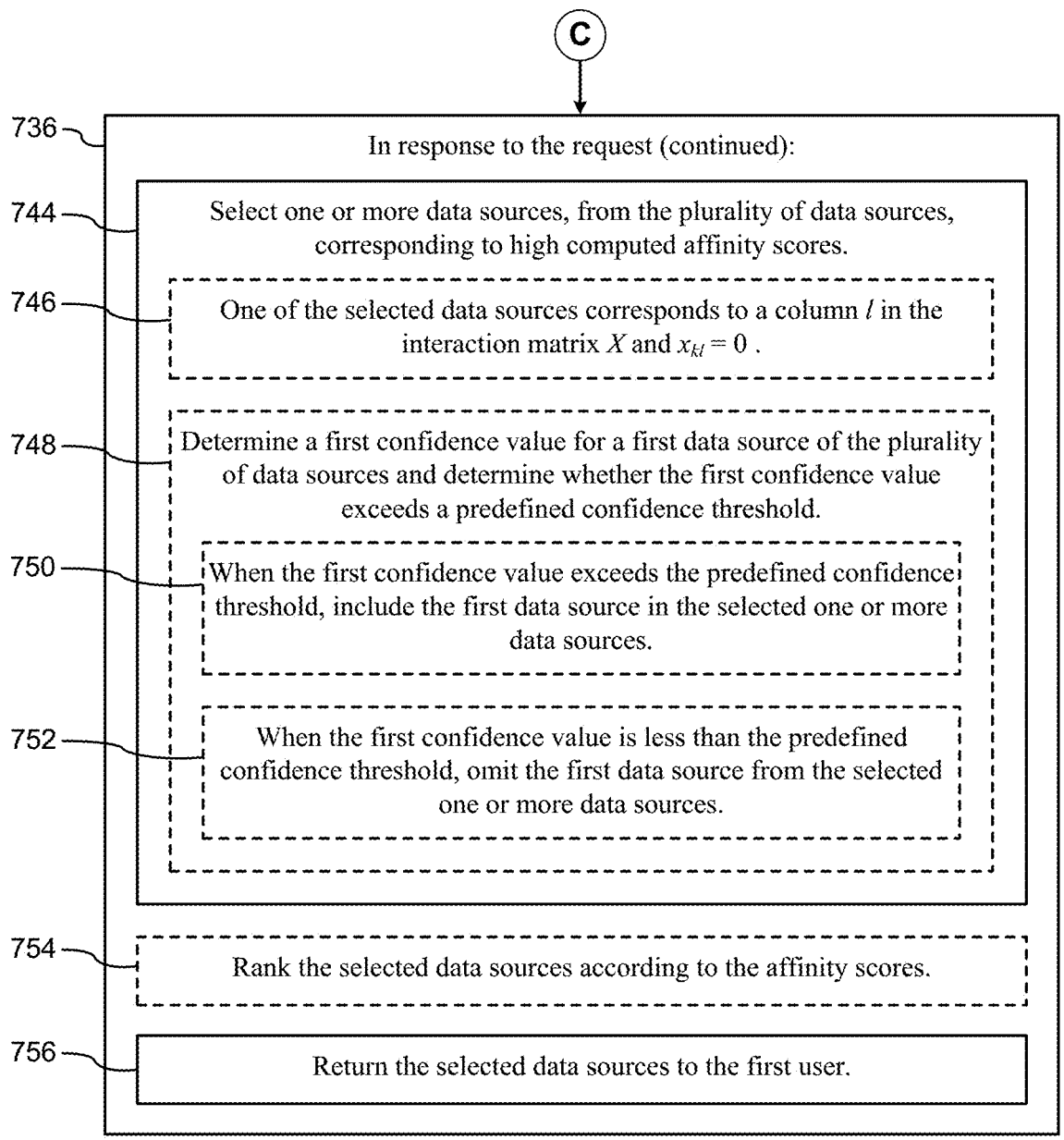

Referring to FIG. 6F, the user interface 606 has been updated based on the selection of a third data table ("Account"). In response to the user's selection of the Account table, a corresponding table indicator 640 is displayed, and the connections indicator 608 is updated to show the Account table 642. Recommendations are also updated in response to the user's selection. The recommendations tab 614 shows that there are now seven recommended data sources based on the user's selection of the Account table. In some implementations, the recommendations are updated to include only data sources that are associated with data server A, database A1, and the Account table. In some implementations, the recommendations are updated to include only data sources that are associated with data server A, database A1, the Opportunity table, the Territory_c table, and the Account table.

FIGS. 7A-7D provide a flowchart of a process 700 for identifying (702) relevant data sources. The process is performed (704) at a server having one or more processors and memory. The memory stores (706) one or more programs configured for execution by the one or more processors. The process constructs (708) an m×n interaction matrix $X=[x_{ij}]$ whose rows correspond to users and whose columns correspond to data sources. In some implementations, the data sources are stored (710) at the data server. Each entry in the interaction matrix measures (712) the extent to which a respective user interacts with a respective data source according to the respective user's interactions, in a graphical user interface for a data visualization application, with data visualizations generated according to data retrieved from the respective data source.

In some implementations, to measure the extent to which a respective user interacts with a respective data source, the process determines (714) the length of time the respective user has spent in the graphical user interface interacting with data visualizations generated according to data retrieved from the respective data source.

In some implementations, to measure the extent to which a respective user interacts with a respective data source, the process determines (716) the number of distinct instances that the respective user has created or opened, in the graphical user interface, data visualizations generated according to data retrieved from the respective data source.

In some implementations, to measure the extent to which a respective user interacts with a respective data source, the process determines (718) the number of distinct data visualizations, generated according to data retrieved from the respective data source, that the respective user has interacted with.

In some implementations, to measure the extent to which a respective user interacts with a respective data source, the process determines (720) the number of times that the respective user has edited, in the graphical user interface, data visualizations generated according to data retrieved from the respective data source.

In some implementations, to measure the extent to which a respective user interacts with a respective data source, the process determines (722) the number of times that the respective user has rendered, in the graphical user interface, data visualizations generated according to data retrieved from the respective data source.

In some implementations, to measure the extent to which a respective user interacts with a respective data source, the process determines (724) the number of times that the respective user has shared, with other users, data visualizations generated according to data retrieved from the respective data source.

In some implementations, to measure the extent to which a respective user interacts with a respective data source, the process measures (726) the complexity of data visualizations generated according to data retrieved from the respective data source, that the respective user has interacted with.

The training process uses the interaction matrix to construct latent user vectors and latent data source vectors. The number of vector components is selected, and the same number is used for both the user vectors and the data source vectors. The number of components is denoted by r. The components of the latent vectors are sometimes referred to as attributes, features, or factors. These attributes have no predefined semantic interpretation. For purposes of computing the vectors, they are arranged into matrices. Assuming there are m users, the m user vectors can be stacked to form an m×r user matrix U. Similarly, the data source vectors can be stacked to form an n×r data source matrix S. In some implementations, the transpose $S^T$ is used in the calculations (which is an r×n matrix).

The process forms (728) the initial m×r user matrix U and the initial n×r source matrix S. In some implementations, the initial entries in these matrices are filled in randomly, typically with decimal numbers between zero and one. As illustrated above in FIG. 5C, the process iteratively refines (730) the values in the matrices U and S to minimize the total squared error 522:

$$\sum_{i=1}^{m}\sum_{j=1}^{n}(x_{ij} - U_i S_j^T)^2$$

In this equation, $U_i$ is (732) the ith row of the matrix U and $S_j^T$ is (732) the jth column of the matrix $S^T$. As illustrated in FIG. 5C, after the iterative refinement, the latent vectors 352 and 354 are read as the rows of the user matrix U and the source matrix S. This completes the training part of the process.

After training, the process uses the data to identify relevant data sources for individual users. The process detects (734) a request from a first user to connect to a data server. The request includes (734) an identifier of the first user and the first user corresponds to the kth row of the interaction matrix X. The user corresponds to a unique latent user vector $\vec{u}$ 352. In response (736) to the request, the process tests the user vector $\vec{u}$ against multiple candidate source vectors $\vec{s}$, , as illustrated in FIG. 5E. For each of the candidate data sources, the process computes (738) an affinity score between the user vector $\vec{u}$ (the kth row of the user matrix U) and the candidate data source vector $\vec{s}$ (the respective row of the source matrix S corresponding to the respective data source). In some implementations, the affinity score is (738) the vector dot product $\vec{u} \cdot \vec{u}$.

As explained with respect to FIG. 5E, the set of candidate data sources can be limited according to selections by the user. For example, the server may receive (740) user selection of a first database by the first user. In this case, computing the affinity scores is limited (740) to data sources from the first database. In some instances, the server receives (742) user selection of one or more tables in the first database. In this case, computing the affinity scores is limited (742) to data sources that include at least one of the one or more tables. This is illustrated above in FIGS. 6A-6F with user selection of the A1 database and the tables Opportunity, Territory_c, and Account.

The process then selects (744) one or more of the data sources corresponding to high computed affinity scores. As explained with respect to FIG. 5E, this selection process can be done in a variety of ways. In some implementations, the selection also accounts for user preferences or other user history as well. For example, a user's colleagues may frequently use a "Sales" data source, but the user does not work with sales data at all. Even if the affinity is high for the "Sales" data source, it can be precluded or downgraded based on specific prior data source selections by the user, based on specific profile preferences, and/or non-selection of data sources that were previously suggested in previous sessions.

Note that the selected data sources are not necessarily ones that the user has ever used before. In particular, one or more of the selected data sources can correspond to a column l in the interaction matrix X, where $x_{kl}$=0 (i.e., the user had not interacted with this data source at the time of the training).

In some implementations, the process determines (748) a first confidence value for a first data source and determines (748) whether the first confidence value exceeds a predefined confidence threshold. When the first confidence value exceeds the predefined confidence threshold, the process includes (750) the first data source in the selected one or more data sources. When the first confidence value is less than the predefined confidence threshold, the process omits (752) the first data source in the selected one or more data sources.

In some implementations, the process ranks (754) the selected data sources according to the affinity scores, and returns (756) the selected data sources ordered according to the ranking. In some implementations, ranking is part of the selection process (e.g., the data sources having the top N affinity scores are selected). In some implementations, the selected data sources are not ranked according to affinity. The process just returns (756) the selected data sources to the first user (e.g., unordered or ordered alphabetically).

In some implementations, the selected data sources that are presented to the user are updated according to subsequent user selections. For example, if a user selects a specific table, the data sources that are presented to the user are updated to exclude data sources that do not include user-selected table.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of identifying relevant data sources, comprising:
    at a server having one or more processors and memory storing one or more programs configured for execution by the one or more processors:
        constructing an m×n interaction matrix X=[$x_{ij}$] whose rows correspond to users and whose columns correspond to data sources, wherein each entry in the interaction matrix measures an extent to which a respective user interacts with a respective data source according to the respective user's interactions, in a graphical user interface for a data visualization application, with data visualizations generated according to data retrieved from the respective data source;
        forming an initial m×r user matrix U and an initial n×r source matrix S;
        iteratively refining the values in the matrices U and S to minimize $$\sum_{i=1}^{m}\sum_{j=1}^{n}(x_{ij}-U_{i}S_{j}^{T})^{2}$$

wherein $U_i$ is the ith row of the matrix U and $S_j^T$ is the jth column of the matrix $S^T$;
        detecting a request from a first user to connect to a data server, wherein the request includes an identifier of the first user and the first user corresponds to the kth row of the interaction matrix X; and
        in response to the request:
            for each of a plurality of the data sources, computing an affinity score between the kth row of the user matrix U and the respective row of the source matrix S corresponding to the respective data source, using a vector dot product;
            selecting one or more data sources, from the plurality of data sources, corresponding to high computed affinity scores; and
            returning the selected data sources to the first user.

2. The method of claim 1, wherein measuring the extent to which a respective user interacts with a respective data source comprises determining a respective length of time the respective user has spent in the graphical user interface interacting with data visualizations generated according to data retrieved from the respective data source.

3. The method of claim 1, wherein measuring the extent to which a respective user interacts with a respective data source comprises determining a number of distinct instances that the respective user has created or opened, in the graphical user interface, data visualizations generated according to data retrieved from the respective data source.

4. The method of claim 1, wherein measuring the extent to which a respective user interacts with a respective data source comprises determining a number of distinct data visualizations, generated according to data retrieved from the respective data source, that the respective user has interacted with.

5. The method of claim 1, wherein measuring the extent to which a respective user interacts with a respective data source comprises determining a number of times that the respective user has edited, in the graphical user interface, data visualizations generated according to data retrieved from the respective data source.

6. The method of claim 1, wherein measuring the extent to which a respective user interacts with a respective data source comprises determining a number of times that the respective user has rendered, in the graphical user interface, data visualizations generated according to data retrieved from the respective data source.

7. The method of claim 1, wherein measuring the extent to which a respective user interacts with a respective data source comprises determining a number of times that the respective user has shared, with other users, data visualizations generated according to data retrieved from the respective data source.

8. The method of claim 1, wherein measuring the extent to which a respective user interacts with a respective data source comprises measuring complexity of data visualizations generated according to data retrieved from the respective data source, that the respective user has interacted with.

9. The method of claim 1, wherein the plurality of data sources is stored at the data server.

10. The method of claim 1, wherein one of the selected data sources corresponds to a column l in the interaction matrix X and $x_{kl}$=0.

11. The method of claim 1, further comprising ranking the selected data sources according to the affinity scores and returning the selected data sources ordered according to the ranking.

12. The method of claim 1, further comprising receiving selection of a first database by the first user, wherein computing the affinity scores is limited to data sources from the first database.

13. The method of claim 12, further comprising receiving selection of one or more tables in the first database, wherein computing the affinity scores is limited to data sources that include at least one of the one or more tables.

14. The method of claim 1, further comprising:
determining a first confidence value for a first data source of the plurality of data sources;
determining whether the first confidence value exceeds a predefined confidence threshold;
in accordance with a determination that the first confidence value exceeds the predefined confidence threshold, including the first data source in the selected one or more data sources.

15. The method of claim 1, further comprising:
determining a first confidence value for a first data source of the plurality of data sources;
determining whether the first confidence value exceeds a predefined confidence threshold;
in accordance with a determination that the first confidence value is less than the predefined confidence threshold, omitting the first data source from the selected one or more data sources.

16. A computing device, comprising:
one or more processors;
memory;
a display; and
one or more programs stored in the memory and configured for execution by the one or more processors, the one or more programs comprising instructions for:
constructing an m×n interaction matrix $X=[x_{ij}]$ whose rows correspond to users and whose columns correspond to data sources, wherein each entry in the interaction matrix measures an extent to which a respective user interacts with a respective data source according to the respective user's interactions, in a graphical user interface for a data visualization application, with data visualizations generated according to data retrieved from the respective data source;
forming an initial m×r user matrix U and an initial n×r source matrix S;
iteratively refining the values in the matrices U and S to minimize $$\sum_{i=1}^{m}\sum_{j=1}^{n}(x_{ij}-U_iS_j^T)^2$$

wherein $U_i$ is the ith row of the matrix U and $S_j^T$ is the jth column of the matrix $S^T$;
detecting a request from a first user to connect to a data server, wherein the request includes an identifier of the first user and the first user corresponds to the kth row of the interaction matrix X; and
in response to the request:
for each of a plurality of the data sources, using a vector dot product to compute an affinity score between the kth row of the user matrix U and the respective row of S corresponding to the respective data source;
selecting one or more data sources, from the plurality of data sources, corresponding to high computed affinity scores; and
returning the selected data sources to the first user.

17. The computing device of claim 16, wherein measuring the extent to which a respective user interacts with a respective data source comprises determining a number of distinct instances that the respective user has created or opened, in the graphical user interface, data visualizations generated according to data retrieved from the respective data source.

18. The computing device of claim 16, wherein measuring the extent to which a respective user interacts with a respective data source comprises determining a number of distinct data visualizations, generated according to data retrieved from the respective data source, that the respective user has interacted with.

19. The computing device of claim 16, wherein measuring the extent to which a respective user interacts with a respective data source comprises determining a number of times that the respective user has rendered, in the graphical user interface, data visualizations generated according to data retrieved from the respective data source.

20. A non-transitory computer readable storage medium storing one or more programs configured for execution by a computing device having one or more processors, memory, and a display, the one or more programs comprising instructions for:
constructing an m×n interaction matrix $X=[x_{ij}]$ whose rows correspond to users and whose columns correspond to data sources, wherein each entry in the interaction matrix measures an extent to which a respective user interacts with a respective data source according to the respective user's interactions, in a graphical user interface for a data visualization application, with data visualizations generated according to data retrieved from the respective data source;
forming an initial m×r user matrix U and an initial n×r source matrix S;
iteratively refining the values in the matrices U and S to minimize $$\sum_{i=1}^{m}\sum_{j=1}^{n}(x_{ij}-U_iS_j^T)^2$$

wherein $U_i$ is the ith row of the matrix U and $S_j^T$ is the jth column of the matrix $S^T$;
detecting a request from a first user to connect to a data server, wherein the request includes an identifier of the first user and the first user corresponds to the kth row of the interaction matrix X; and
in response to the request:
for each of a plurality of the data sources, computing an affinity score between the kth row of the user matrix U and the respective row of S corresponding to the respective data source, using a vector dot product;
selecting one or more data sources, from the plurality of data sources, corresponding to high computed affinity scores; and
returning the selected data sources to the first user.

* * * * *